United States Patent [19]

Brittian et al.

[11] 3,882,446

[45] May 6, 1975

[54] INTERACTIVE HORIZON BUILDING, ANALYSIS AND EDITING

[75] Inventors: Ronel W. Brittian, Dallas; Falvey L. Malarcher, Plano; William A. Schneider, Dallas, all of Tex.

[73] Assignee: Texas Instruments Incorporated, Dallas, Tex.

[22] Filed: Dec. 30, 1971

[21] Appl. No.: 214,145

[52] U.S. Cl. ..... 340/15.5 DS; 178/18; 340/15.5 DP; 340/172.5; 340/324 A; 340/365 R

[51] Int. Cl. ......... G01v 1/28; G01v 1/34; G06f 3/14

[58] Field of Search ........... 444/1; 340/15, 15.5 DP, 340/15.5 DS, 324 A, 324 AD, 324 R, 172.5, 365 R; 178/18, 20

[56] References Cited

UNITED STATES PATENTS

| | | | |
|---|---|---|---|
| 3,399,401 | 12/1968 | Ellis et al. | 340/172.5 |
| 3,573,855 | 4/1971 | Cragon et al. | 340/172.5 |
| 3,579,196 | 5/1971 | Gregg et al. | 340/172.5 |
| 3,585,597 | 6/1971 | Holmerud | 340/172.5 |
| 3,611,301 | 10/1971 | Parks | 340/172.5 |

*Primary Examiner*—Harvey E. Springborn
*Assistant Examiner*—Michael Sachs
*Attorney, Agent, or Firm*—Hal Levine; Rene E. Grossman; Leo N. Heiting

[57] ABSTRACT

A programmed computer-human interaction edit method and system for stored seismic horizon data where a two-dimensional graph of such primary horizon data is placed on a data tablet input to the programmed computer and wherein phantom horizon data with reference to coordinates of the graph are generated in response to human contact through the graph to the data tablet for direct input to the computer. Phantom horizon data is stored in a horizon segment file with primary segment data while preventing entry to the horizon segment file of horizon segment data beyond preselected constraints. Responsive to human contact through the graph to the data tablet at the location of phantom horizons and to stored horizon segment data, a first display of segments of two contiguous phantom horizons is produced with all constraint satisfying segments on the graph within a selectable time gate above and below both of the phantom horizons. A second display is produced of depthpoint-RMS velocity profiles for all segments on the first display. A third display is produced of depthpoint-interval velocity data for the earth section between the horizons on the first display. Upon deletion of any segment from the first display, automatically and substantially simultaneously the second display and the third display are modified to reflect the removal of data corresponding to any deleted segment.

6 Claims, 32 Drawing Figures

INTERACTIVE HORIZON BUILDING, ANALYSIS AND EDITING

This invention relates to computer-human interactive construction of a reliable seismic horizon data base, and more particularly to an interactive method of machine processing seismic data.

A seismic prospect normally is worked by selecting lines along which seismic shooting operations are to be performed. Traverses laid out in a grid permit analysis of subsurface horizons in closed loops. Thus, as in surface contour surveying practices, elevations around a loop may be tied back to the starting point. Accuracy of the elevations at all points around the loop is confirmed by loop closure.

In accordance with U.S. Pat. No. 2,732,906 to Mayne, common depthpoint seismic surveying provides for a statistical improvement of the raw seismic data. In common depthpoint seismic surveying, seismic signals reflected from a common subsurface reflecting point and detected after travel over many different paths are corrected for differences in geometry of the travel paths, i.e., normal movement. The signals are then combined or summed to provide a single tract which statistically represents the composite reflection of seismic energy traveling over the several paths to and from the common reflection point. When such operations are carried out over traverses of significant length, a seismic section may be produced which in essence is a graph of the amplitude of the composite common depthpoint reflections as a function of seismic record time. Such time-amplitude sections may be presented in several different modes. The modes have come to be referred to as wiggle trace, variable area, variable density and the like.

Having produced such a seismic section for a given traverse, an interpreter may view the section graph and observe coherence across the graph between adjacent traces. Such coherence may appear at various time points down the graph. Coherent high amplitude portions of the traces may be referred to as seismic segments which if real and properly related to velocity at which the seismic energy traveled, indicates the depth of the seismic reflector in the earth. The presence of well defined continuous horizontal subsurface reflecting horizons under a constant velocity overburden appears on a seismic record section as horizontal lines. Such lines on a seismic section are formed by high amplitude signals being substantially in phase across an entire record section.

The volume of seismic data embodied in a seismic record section can become astronomical. This is readily apparent when it is considered that seismic waves may be detected at points on the earth's surface spaced about 100 feet apart over a traverse of ten to twenty miles in length. For each depthpoint there will be added together as many as 24 seismic traces to form a single trace on a seismic record section. The traces each will be digitized with time samples taken at intervals of the order of from 0.001 to 0.004 seconds.

The present invention is concerned with the utilization of automatic data processing systems with human intervention, and particularly to a phase of such processing techniques which are carried out after segments have been identified.

Common depthpoint seismic data will be used herein by way of example, but other types of data may also be processed. Preferably, data defining seismic segments will be of the type produced by Geophysical Services, Inc. of Dallas, Texas, a subsidiary of Texas Instruments Incorporated, through use of the methods sold and used under the name "600 Package" and "700 Package," the former being described in a bulletin entitled "600 Package" dated July 1970. Such data is stored in retrievable form in computer storage. For the purpose of the present invention, it will be assumed that a segment summary file exists for individual space gates into which a given seismic traverse may be divided. The segment data in a segment summary file for each space gate may then be stored and retrieved as a unit for further refinement and processing.

Seismic segments appearing on a given seismic section graph will be identified by said "600 Package" process or may otherwise be cataloged in accordance with the following table.

TABLE I

| WORD | SYMBOL | Summary File Entries DESCRIPTION |
|---|---|---|
| n | $IDE_i$ | Segment number (sequence ordered in depthpoint/time.) |
| n+1 | $DPR_i$ | Initial depthpoint of segment upper 9 bits, number of depthpoints lower 9 bits. |
| n+2 | $A_{0_i}$ | Time (ms) of the segment at the reference depthpoint. |
| n+3 | $A_{1_i}$ | Gradient (0.1 ms/dp) of segment at reference depthpoint. |
| n+4 | $A_{2_i}$ | Second derivative of time of segment at reference depthpoint (0.01 ms). |
| n+5 | $MA_i$ | Local mean amplitude of segment from IDP (initial depthpoint) to FDP (final depthpoint). |
| n+6 | $MM_i$ | Local mean moveout of segment from IDP to FDP. |

The data appearing in Table I preferably is further distilled in accordance with operations described and claimed in "Interactive Multidimensional Classification and Sorting of Seismic Segment Data", Ser. No. 214,188, filed Dec. 30, 1971 and "Method and System For The Interactive Determination of Subsurface Velocity From Seismic Segment Data," Ser. No. 214,189, Filed Dec. 30, 1971.

In accordance with the present invention, a programmed computer-human interaction edit method is provided for seismic horizon data base stored with a seismic section summary file. A two-dimensional graph of such seismic data is employed. Phantom horizon data are generated with reference to coordinates of the graph in response to human operation on the graph for direct input to the processor. The invention comprises storing the phantom horizon data with seismic section summary file data in retrievable form in a horizon segment file while preventing entry to the horizon segment file of summary file data which are outside preselected constraints. In response to horizon segment file data, a first display is produced of two contiguous phantom horizons along with all constraint satisfying primary seismic segments on the graph within a selectable time gate above and below the phantom horizons. A second display is produced of the RMS velocities for all segments on the first display. A third display is produced of the interval velocity for the seismic section between the horizons on the first display. Upon deletion or alteration of any segment from the first display, automatically and substantially simultaneously the second display of RMS velocity and the third display of interval velocity are modified to reflect the change. Data representing the operator's designation of a reflector at a location within the constraints is then stored and/or displayed.

It should be appreciated that although the invention has been characterized as comprising four individual display screens, another possible embodiment which does not depart from the sprit of the present invention is the use of a single display screen having four discrete display areas thereon.

For a more complete understanding of the present invention and for further objects and advantages thereof, reference may now be had to the following description taken in conjunction with the accompanying drawings in which.

Figures 1, 2:
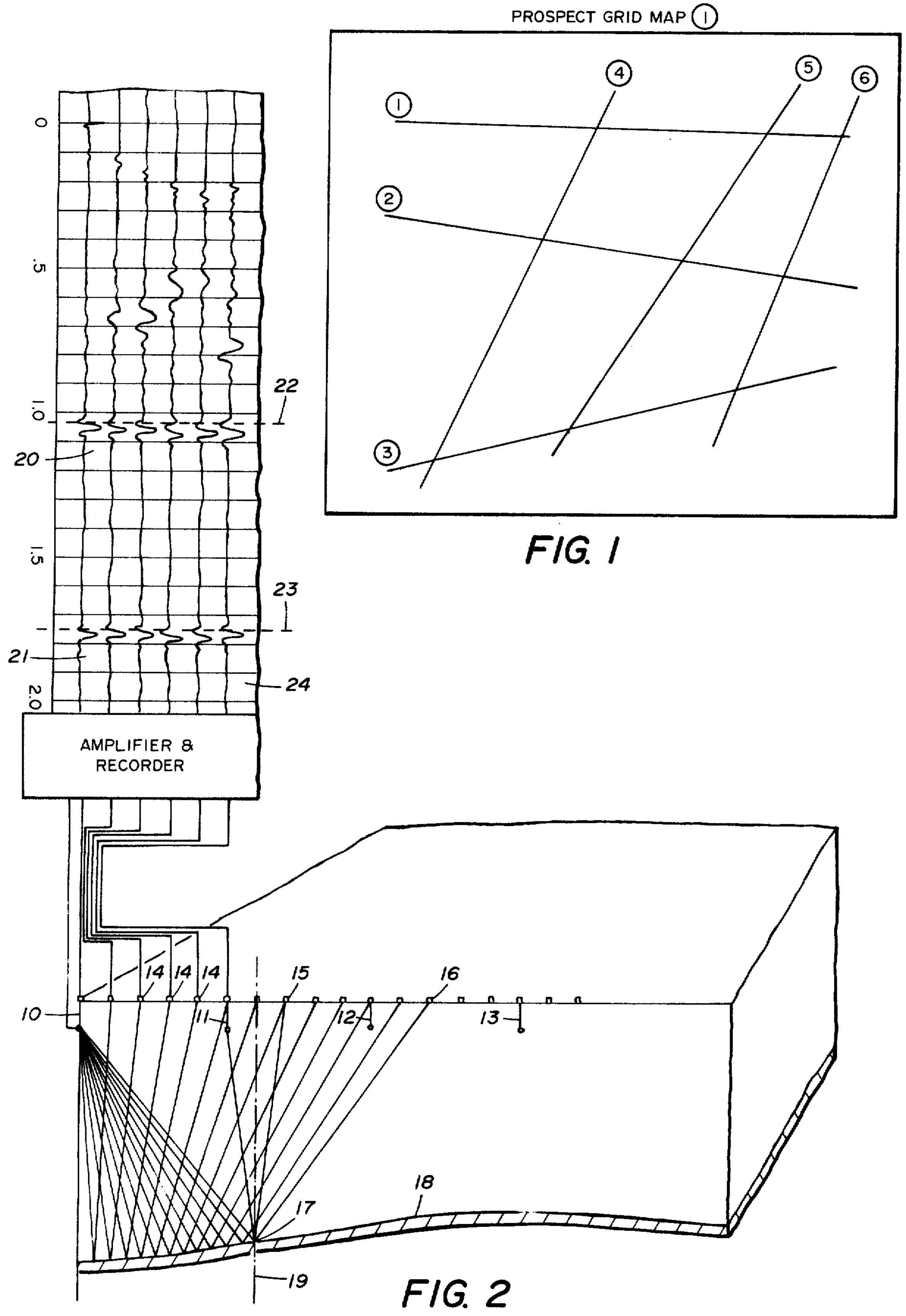
FIG. 1 is a typical prospect grid map illustrated in plan view.
FIG. 2 is a schematic representation of a portion of the grid map of FIG. 1 illustrating common depthpoint operations and identifying and defining depthpoint as used herein.

Referring now to FIG. 1, a plan view of a seismic exploration prospect is shown. The prospect may be of the order of twenty miles square. Six seismic traverses are designated. Traverses 1–6 are lines along which seismic exploration will be conducted to provide seismic data, preferably common depthpoint data of the type generally disclosed in U.S. Pat. No. 2,732,906 to Mayne. Further, the seismic data preferably will be recorded digitally as is well known in the art, the recordings being in reproducible form for storage in an automatic data processing system.

In FIG. 2, line 1 of the prospect has been illustrated wherein shot points 10, 11, 12 and 13 form a portion of a series of shot points along line 1 with geophones 14 positioned at uniform spacings along line 1 for detection of seismic energy. Common depthpoint stacking procedures involve combining signals such as generated by geophone 15 of energy from shot point 11 with signals from geophone 16 of seismic energy generated at shot point 10. A common reflecting point 17 lies on a reflecting horizon 18.

For the purpose of the present invention, the term depthpoints will be employed to refer to the surface location of a line 19 which contains subsurface reflection points such as point 17. Thus, from operations based upon the geometry illustrated in FIG. 2, there would be data generated for depthpoints corresponding with the location of each of the geophones along line 1 and also for depthpoints located midway between each of the geophones along line 1.

By detonating the explosive at shot point 10 and detecting the same at a given set of detectors along line 1, there may be produced a normal wiggle trace seismogram 24 which has the instant of detonation of the explosive scaled at zero time and with the time of travel to a reflecting point and back to the earth's surface scaled along the length of the record.

In idealized form, two reflections have been illustrated on record 24. A first reflection 20 which occurs at about 1.0 second on the record and the second reflection 21 that occurs at about 1.75 seconds. Because of the presence of noise, multiple reflections and the like, seismic record sections may contain many false reflections (not shown) along with true reflections.

In accordance with prior art techniques, the individual traces in digitized form are analyzed to identify seismic segments identified as set out in Table I above.

In FIG. 2, it will be noted that there is coherence in reflection 20 in that all of the troughs occur along the dotted line 22. Similarly, dotted line 23 represents a time pick of the lineup of the troughs in reflection 21. Similar lines may be plotted for peak segments. On the simplified seismogram of FIG. 2, time-depthpoint data representing lines 22 and 23 would form what will be referred to herein as primary seismic segments.

For a seismic record section the data from which is stored in memory in the form of Table I, each seismic segment is identified by a segment number. In carrying out the present invention, depthpoints are selected along the traverse, not at the frequent intervals illustrated in FIG. 2, but at depthpoints which occur at the order of three or four points per mile. For each such depthpoint, the seismic segments encountered will be stored as in Table I. At the same time, a seismic section which is a graph of line 1 is produced and used herein. Two main sets of data are employed in the present invention: (1) segment data stored in the format of Table I and (2) a corresponding seismic record section.

The present invention provides for a refinement of the record section to eliminate extraneous unwanted, unreal or erroneous seismic segments and to provide an ultimate section which is more reliable.

Major steps are as follows:

1. Interactively input a phantom horizon or delineator such as a fault consisting of (depthpoint, time) pairs via the digital data tablet.

2. Select segment data within a specified threshold about the phantom horizon on the basis of time, RMS velocity and amplitude.

3. Display the selected segment data to an operator on a storage tube display system to permit the user interactively to analyze and edit the segment data in order to add the velocity attribute to the subsurface model.

Conventional processing to accomplish the same goal is a laborious task involving manual segment selection and is available only in a batch processing environment. Cost and time prohibit the construction of a detailed subsurface model using conventional methods.

Thus, important features of the present method are:

1. Interactively to analyze and edit segment data and observe the perturbation on RMS and interval velocity in a real-time environment.

2. Optionally to honor the segment data or to provide an RMS velocity function of the operator's choice via an interactive input in the form of a data tablet with similar capability for the operator to override the time attribute of the selected segment data.

3. To define and edit horizons with a visual display of horizon information.

4. To obtain a subsurface model with a higher confidence level in less time.

Figure 3:
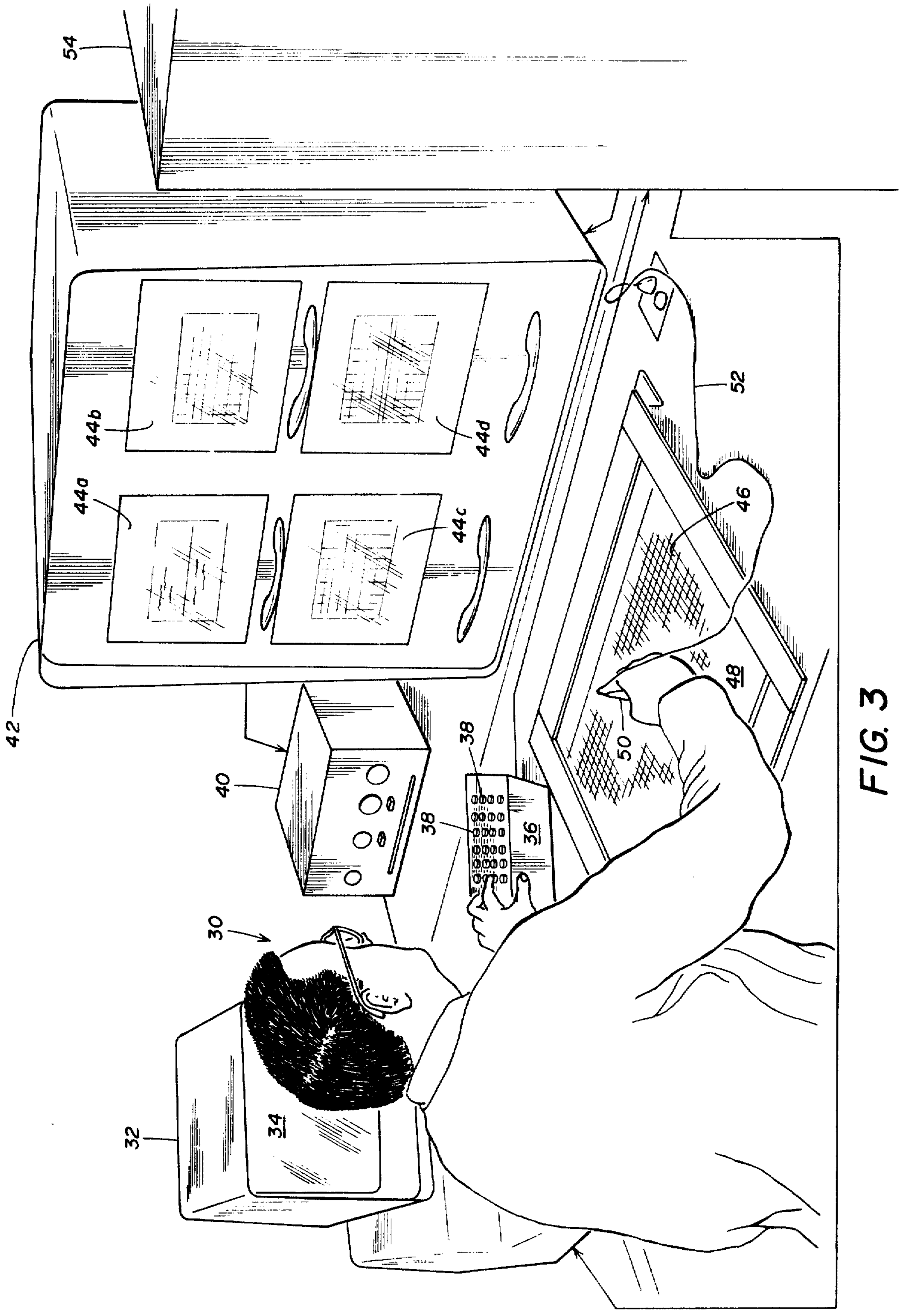
FIG. 3 is a perspective view of a computer-human interaction system employed in carrying out the present invention.

FIG. 3 illustrates basic system components employed herein. An operator 30 who is to interpret seismic data faces a plurality of instruments. Included are:

a conventional keyboard machine 32 which has a visual readout screen 34;

a function key set 36 which includes a plurality of function keys 38 which may be manually depressed by operator 30 to initiate automatic performance of functions to be later described;

a reproducing machine 40 interconnected with the system to provide hard copies of displays selected by operator 30;

a monitor 42 which includes four storage tube display screens 44*a*–44*d* upon which are displayed various functions during the operation of the system; and a data responsive surface 46 disposed on the table in front of the operator 30 over which a seismic section 48 may be placed.

The seismic section 48 graphically corresponds with the source of the data set to be interpreted and is an object upon which operations are performed. Graph 48 has as time ordinates and depthpoint locations as abscissae. A plurality of space gates taken along a seismic survey line may be encompassed by graph 48. Such graphs are commonly termed "VAR sections" which are variable area type of seismic signal presentations.

The data responsive surface 46 comprises a flat insulating sheet or plate overlaying a network of X–Y conductors, not shown. A stylus 50 connected by an electric cable 52 is held by operator 30 and is moved adjacent the location of selected points on graph 48 to initiate selected displays upon the display unit 42. Stylus 50 senses electric fields generated by the network of conductors. In one mode, circuitry associated with stylus 50 and data responsive surface 46 generates electrical signals representative of the position of stylus 50 relative to graph 48. The path of the stylus may be made immediately to appear on one of the displays 44*a*–44*d* in true relation to the coordinates on graph 48. In general, the capability of writing on a screen in real time in response to movement of a stylus over a data tablet is well known.

An automatic data processor 54 is interconnected with the various components of the system illustrated in FIG. 3 uniquely to interact with operator 30 to provide desired displays of seismic data upon the display screens 44*a*–44*d*.

In a preferred embodiment, the computer 54 comprises a SEL 810A computer manufactured and sold by Systems Engineering Laboratories of Fort Lauderdale, Florida. In order to supply needed storage and processing capability, an 870A TIAC computer manufactured by Texas Instruments Incorporated of Dallas, Texas is utilized in tandem with the SEL 810A. The 870A is described in TIAC Model 870A Programmers Reference Manual, Texas Instruments Incorporated, 1968. However, other general purpose digital computers could be utilized.

A suitable keyboard 32 for use with the invention is manufactured and sold by Computek, Inc. of Cambridge, Massachusetts and identified as 400 CRT Display System.

A suitable reproducing machine 40 is Model 4601, manufactured and sold by Tektronik, Inc. of Portland, Oregon.

Display units 44*a*–44*a* comprise a Computek Model 430. Information relative to the formation of output display buffers for use with the display system is found in the "User's Manual Series 400 CRT Display System," Bulletin 400M, published July, 1969, by Computek, Inc. of 143 Albany Street, Cambridge, Massachusetts.

A data responsive table 46 suitable for use with the invention comprises a system heretofore manufactured by Bolt, Beranek & Newman, Inc., Data Equipment Division, Santa Ana, California and now manufactured by Compunetics of Monroeville, Pennsylvania. A suitable tablet 26 is identified as "Model 2020 Data Tablet".

Preparatory to carrying out the present method, computer 54 receives and stores segment data for one or more space gates, the data being in the form designated in Table I. Computer 54 also stores therein instructions to operate upon the stored segment data. Horizon segment data will be then displayed upon screen 44a as designated by operator 30. Operator 30 may actuate a function key in set 36 selectively to vary any portion of the displays on screens 44*a*–44*d*. By operation of the reproducing machine 40, the operator 30 may produce permanent records of the results of operation of the system.

Operation in accordance with the invention is initiated by the operator 30 by positioning the graph 48 upon the data responsive surface 46 and by setting up the system for operation by the use of the keyboard 32. As previously noted, the graph 48 preferably comprises a common depthpoint stack section or graph having time-depthpoint coordinates divided up into a plurality of space gates and for which the Table I data has been stored in computer 54.

Horizon Definition Phase

In a horizon definition phase, operator 30 generates phantom horizon data. This is done by tracing a line with stylus 50 across the graph 48. The line is one which, in the opinion of operator 30, corresponds with the most likely location of a reflecting horizon. Such choice is made from the operator's visual inspection of and judgment relative to graph 48. Operator 30 sets the system so that on one of the screens 44*a*–44*d* there will be presented a scaled representation of the phantom horizon traced by operator 30. More particularly, as shown in FIG. 4, operator 30 would cause screen 44*c* to provide a presentation wherein time is scaled along the vertical border and the locations of depthpoints scaled along the bottom horizontal border, in replication of part of the scale on graph 48.

Operator 30 may then select a number of zones in which he concludes that a reflecting horizon is present. FIG. 4 illustrates phantom layers 61–66 chosen by operator 30. Layer 61 has a block 61*a* which does not directly die with a second block *b*. Breaks in time are also identified between 61*d* and 61*e*. A break also separates blocks 61*e* and 61*f*. In a similar manner, the operator traces with stylus 50 blocks 62*a*–62*e* of layer 62. Blocks 63*a*–63*d* comprise layer 63. Blocks 64*a*–64*d* comprise layer 64. Layers 65 and 66 are considered by operator 30 to be continuous unbroken blocks. Operator 30, based upon such interpretation of the graph 48, may then trace paths which he postulates are delineators which represent faulting.

Figure 4:
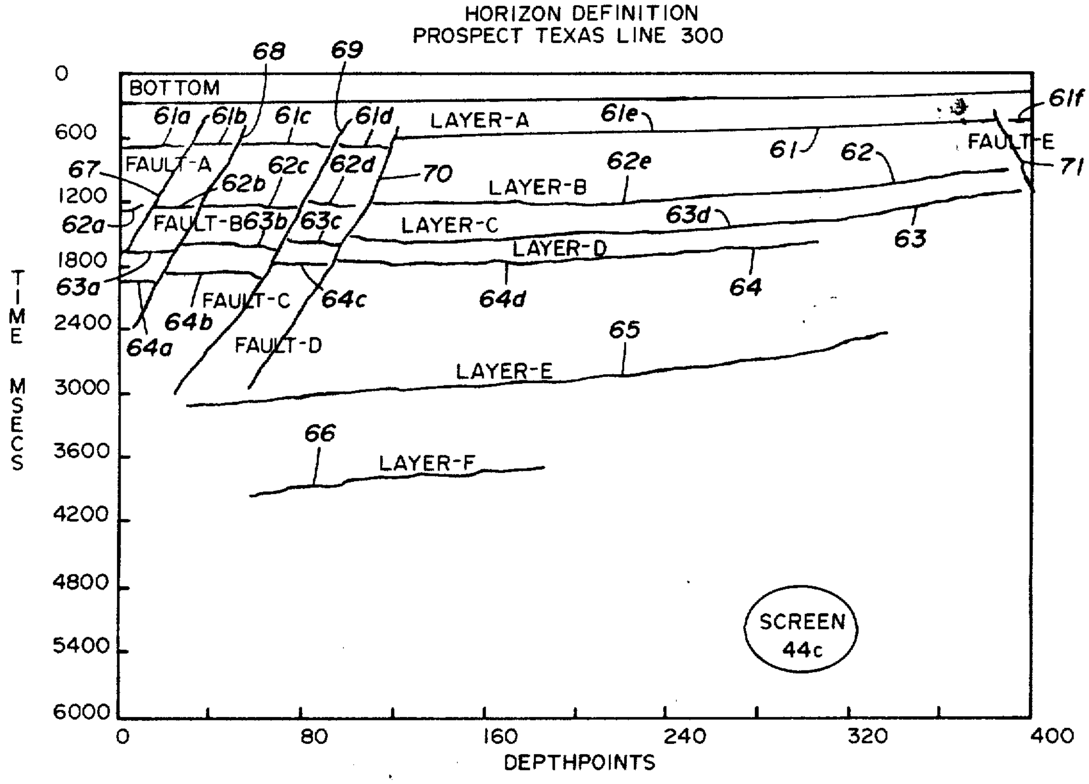
FIG. 4 illustrates selection of horizon and dilineators as may be carried out by an operator in the system of FIG. 3.

In FIG. 4 five faults 67–71 have been postulated by operator 30. Data representing faults 67–71 produced in the initial operation are stored. More particularly, lines representing faults 67–71 are traced by stylus 50 and as they are so traced, the system generates and stores in retrievable form sets of data representing the lines themselves so that in response to computer operation when called upon, the delineator can be retraced for display or for printing. Such delineators will be named, i.e., given a code number and the time-depthpoint data will be stored. The same is true as to the data representing layers 61–66. As they are traced, representative time-depthpoint data are stored in the computer 54 along with a given code number.

The main purpose in this phase of the interactive horizon building system is to enable the user to enter phantom horizons and delinerators into the horizon data base. The main input is an interpreted seismic section; the main output is an updated horizon data base containing phantom horizons and/or delineators.

Operator 30 will process one section of a line at a time; the program can be executed several times to process multiple sections or lines. All horizons and delineators entered for a given section are maintained in computer 54 memory. Operator 30 may delete and redraw or add new horizons and delineators without committing the information to the horizon data base until he has the structure in the section defined exactly as he chooses. At any time during this phase, operator 30 may depress a function key to select a "Horizon Extension " option. If he does so, when any grid is redrawn, information is extracted from the horizon data base about existing horizons and delineators in the section. This information is put into the form of a display file which is then read and plotted on the appropriate one of screens 44*a*–44*d*.

When operator 30 finishes processing a section of a line, the phantom horizon and delineator information is sent to the 870A disk as a phantom file which is then added to the current horizon data base.

HORIZON EDIT PHASE

Figure 5:
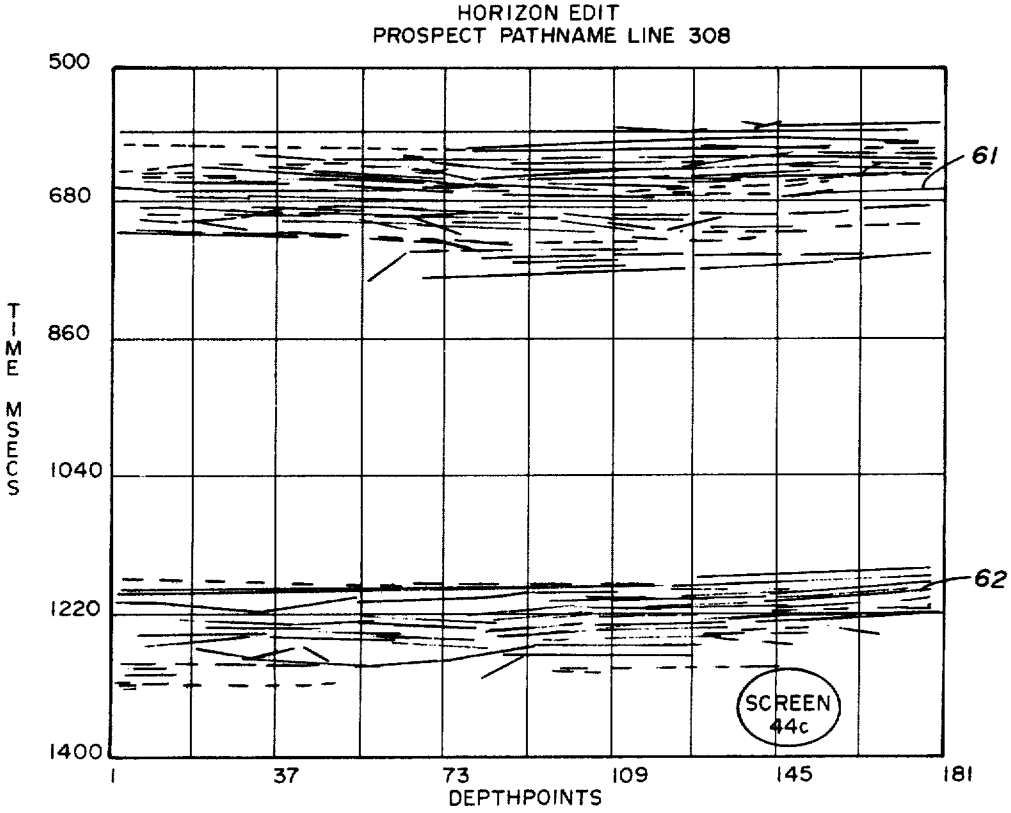
FIG. 5 illustrates a display of two contiguous phantom horizons and stored seismic segment data which satisfies predetermined constraints and which lie within predetermined time gates relative to the two phantom horizons.

In a horizon edit phase, a set of working displays are provided on screens 44*a*–44*d*. More particularly, FIG. 5 illustrates a display which will be presented on screen 44*c*. FIG. 5 is representation having an enlarged time scale of portions of the phantom horizons 61 and 62, as drawn by operator 30. Also shown are all of the primary segments stored in a memory within predetermined thresholds about the layers 61 and 62. More particularly, upper phantom horizon 61 is at a time of about 680 milliseconds. All primary seismic segments lying within ±100 milliseconds of horizon 61 are displayed. Similarly, the second phantom horizon 62, FIG. 5, appears at about 1260 milliseconds with all of the primary segments displayed which lie within ±50 milliseconds of layer 62.

Figure 6:
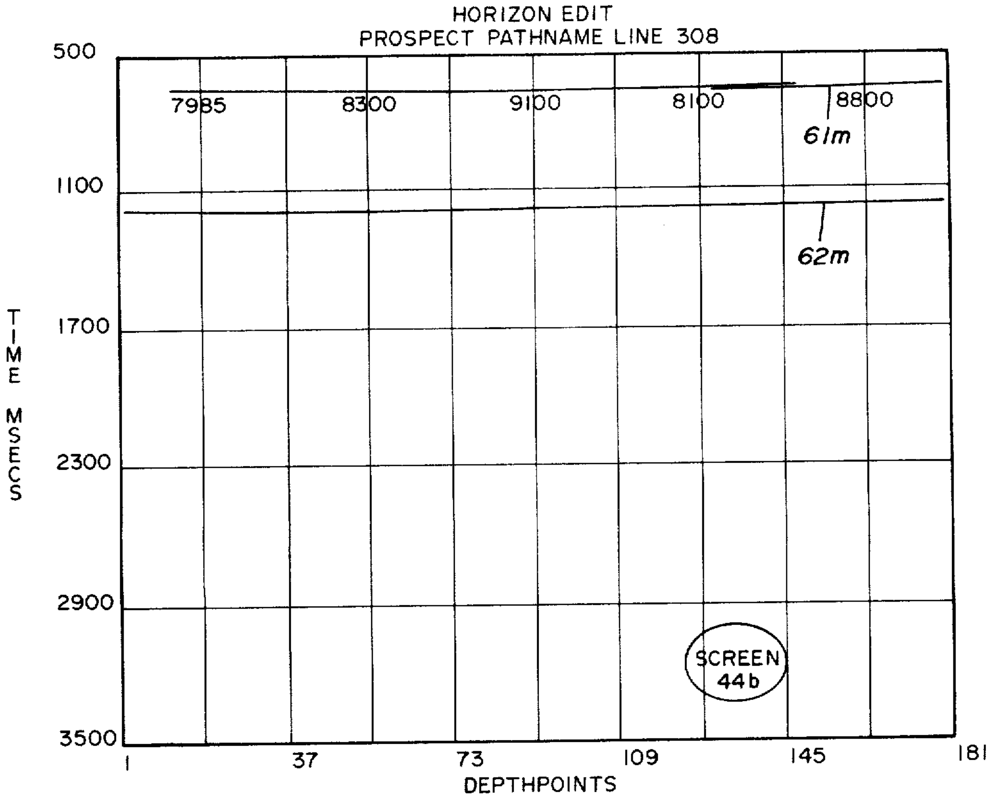
FIG. 6 illustrates a display employed in accordance with the present invention which illustrates a display after having selected a first horizon as being a true horizon.

FIG. 6 illustrates an accumulation display. On screen 44*b*, a grid is presented upon which data ultimately satisfactory to 30 will be displayed.

Figure 7:
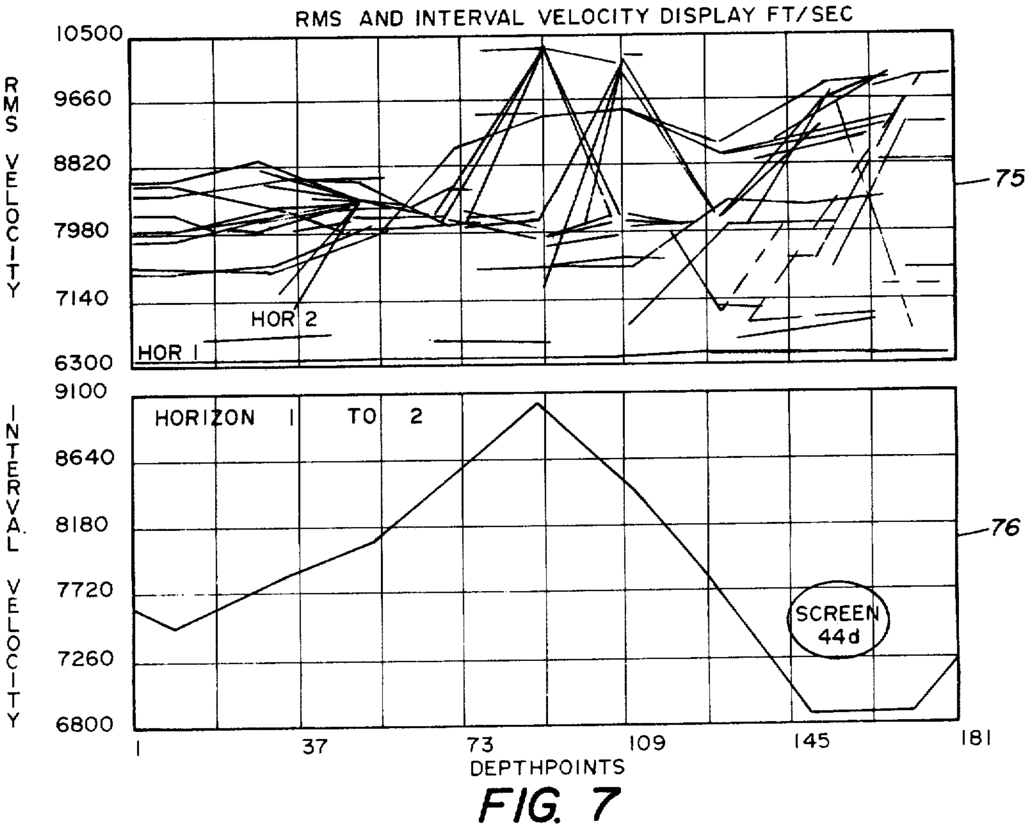
FIG. 7 illustrates a display of RMS and interval velocities as produced in the system of FIG. 1 for use by an operator.

Screen 44*d* will display data forming two graphs shown in FIG. 7. The first graph 75 is an RMS velocity graph for each of the segments displayed in FIG. 5. The second graph 76 portrays the interval velocity, namely the velocity over the vertical section of formations between the horizons 61 and 62.

Figure 8:
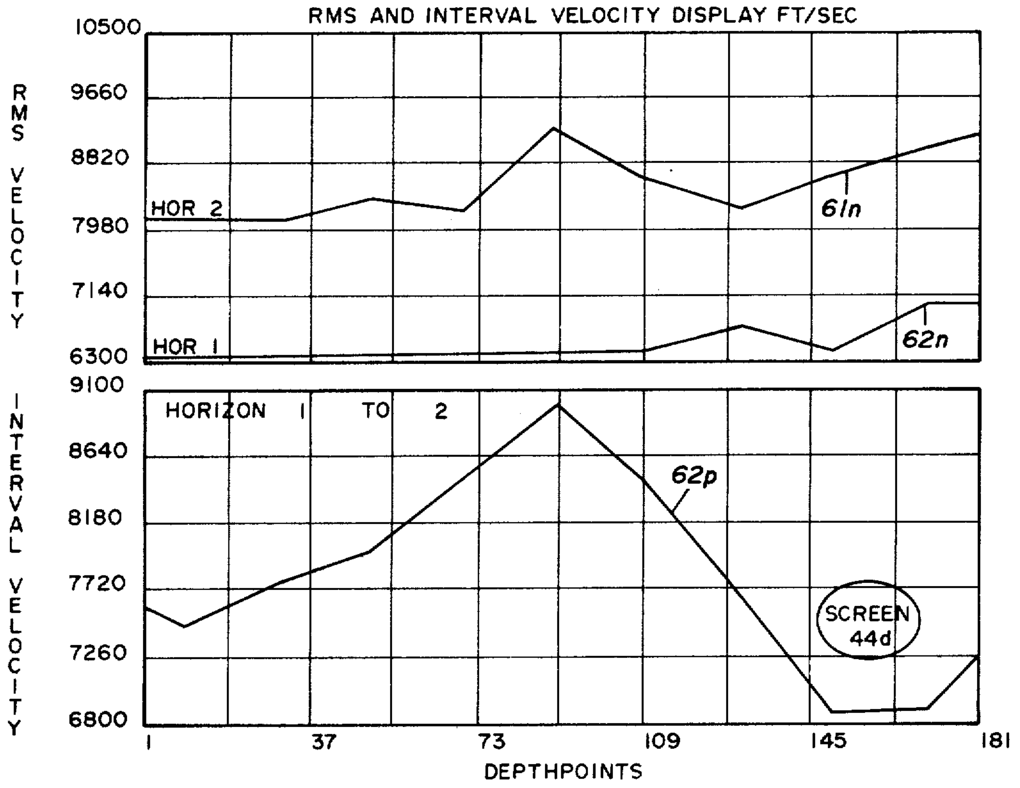
FIG. 8 illustrates a modification of the display of FIG. 7 in the course of operations carried out in accordance with the present invention.

FIG. 8 illustrates a modification of the data shown in FIG. 7. The modification is achieved in the course of the edit process as will later be described.

Screen 44*a*, FIG. 3, will provide a display of the amplitudes of the seismic signals comprising each of the seismic segments. Horizon 1 amplitudes will be plotted across the top half of the screen. Horizon 2 amplitudes will be plotted across the bottom half.

Thus, the operator has presented to him on screens 44*a*–44*d* all of the primary seismic segments lying within predetermined thresholds about each of two contiguous phantom horizons, together with RMS velocities for the various primary segments and for the interval therebetween, respectively, and a portrayal of the amplitude of all primary seismic segments.

The display computer system is programmed to respond to operator 30 through stylus 50 and through the key set 36 to manipulate the data appearing on screens 44*a*–44*d* for the selection and editing of horizons to form a subsurface model with a higher confidence level than has heretofore been possible. This is made possible by operation of the interactive programmed computer-human linkage in such a manner to provide real time displays of any changes desired with the possibility of rewriting and reworking the data at the will of operator 30.

In the edit phase, the purpose is to integrate segment information from a horizon segment file into the subsurface model. Section summary files covering the area of interest are resident on the disk at the time this phase of the processing is entered. The main output is an updated horizon data base which contains "true" horizons as replacements for phantoms; the true horizons will have a space-varying RMS velocity attribute associated with them. They will be accumulated and displayed on screen 44*b*.

Operator 30 specifies all parameters used in picking segments about horizons. The names of the horizons in the order to be edited must be specified as well as the name of the input section summary file to be used, plus the name of the output horizon segment file to be used. Operator 30 may either name a phantom file to use as input or may indicate that the horizon data base is to be used. In the latter case, a temporary phantom file with the same spatial extent as the input section summary file is extracted from the horizon data base.

The operator 30 calls for selection of segments within specified thresholds about horizons. The main input is a phantom file and a section summary file; the main output is a horizon segment file which contains all of the selected segments in the section of interest. When the first part (two horizons) of a horizon segment file have been input, the horizon edit process can begin.

In the horizon edit process, operator 30 analyzes and edits the segment data about each horizon. He can selectively delete segments and observe the time and RMS velocity averages of the remaining segments. He can select one segment to represent the "true" horizon. Alternatively, if he chooses, he can draw in the time and/or RMS velocity of the horizon in question. During the horizon edit process, operator 30 can select the "horizon extension" option just as he could in the horizon definition process. By depressing the appropriate function key, operator 30 can set a mode whereby a program reconstructs a current data display whenever grids are redrawn. The latter program may provide the horizon extension file for use in the horizon edit process with the horizon extension information available on two screens 44*c* and 44*d*.

When operator 30 finishes editing a given horizon, the horizon file is sent to the 870A disk for storage. Phantom horizons in the horizon data base are then replaced with the "true" horizons contained in the horizon file.

Certain segments in the original input section summary file will be flagged. Segments selected about the phantom as well as segments (if any) contributing to the "true" horizon will be marked with special flags. The flags can then be used to obtain various segment displays which, in conjunction with section displays from the horizon data base, will provide a hard copy record of the horizon edit process.

The edit process is repeated for each horizon in the section of interest.

Operations under control of operator 30 are carried out by his generation of input data through the use of stylus 30 as above described and his manipulation of the function keys in the unit 36.

The functions that may be selected are as set out in Table II.

TABLE II

| Key No. | Function |
|---|---|
| 0 | assign input device. |
| 1 | Edit parameters. |
| 2 | Restart link. |
| 3 | Terminate JCE request. |
| 4 | Register. |
| 5 | segment edit. |
| 6 | active horizon-time. |
| 7 | Active horizon-velocity. |
| 8 | Accept horizon. |
| 9 | Skip horizon. |
| 10 | Delete horizon. |
| 11 | Restore segments. |
| 12 | HDB display. |
| 13 | Accept active segment. |
| 14 | Sample. |
| 15 | Con sample. |
| 16 | Track time. |
| 17 | Track velocity. |
| 18 | Track amplitude. |
| 19 | Active segment delete. |
| 20 | Trial average. |
| 21 | Restore all segments deleted. |
| 22 | Replot. |
| 23 | Zoom-time. |
| 24 | End block. |
| 25 | Edit segments on amplitude. |
| 29 | Active segment-time. |
| 30 | Active segment-velocity. |
| 31 | Time tracking (a) on - hard copy; (b) off - data tablet. |

TABLE III - HORIZON SEGMENT FILE FORMAT

| Word | Description |
|---|---|
| 1–28 | Pathnames (Prospect, Type, Phase, Line, Range, Version, File) |
| 29 | Min. Dp |
| 30 | Max. Dp |
| 31 | Min. Time MS. |
| 32 | Max. Time MS. |
| 33 | Min. RMS Velocity FT/SEC. |
| 34 | Max. RMS Velocity FT/SEC. |
| 35 | No. of Gates N |
| 36 | DP of Gate Center Gate 1 |
| . | |
| . | |
| 36+N | No. Horizons K |
| 37+N | Word offset to first Horizon |
| . | |
| . | |
| 37+N+K | No. Words in HSF |
| 38+N+K | UNIT - SWITCH |
| . | |
| 128 | Last Word of HSF header |

TABLE IV - HORIZON SECTION OF FILE

| Word | Description |
|---|---|
| 1–4 | Horizon Name |
| 5 | No. BLOCKS B |
| 6 | No. Segments Block 1 |
| 7–10 | End Point Classification Start Block 1 |
| 11–14 | End Point Classification End Block 1 |
| 15 | No. Segments Block 2 |
| . | |
| . | |
| . | |
| 6+9B | Segment ID |
| 7+9B | SDP - Start Depthpoint |
| 8+9B | EDP - End Depthpoint |
| 9+9B | No. Words this segment |
| 10+9B | Time at SDP |
| . | |
| . | |
| 9+9B+J | Time at EDP |
| 10+9B+J | Velocity at SDP |
| 9+9B+2J | Velocity at EDP |
| . | |
| 10+9B+2J | Amplitude at SDP |
| 9+9B+3J | Amplitude at EDP |
| 10+9B+3J | Segment ID |

With the data thus present in the horizon segment file, the edit operation may then proceed under the control of operator 30 with the capability of the computer marshalled and available to carry out the operation indicated in Table V. The edit operation detailed in Table V begins with information from the section summary file and from the phantom file available. Such information is called in response to steps identified as step 100 et seq. Operator 30 initially depresses key 1 of unit 36 to initiate the edit operation.

TABLE V

| No. | Key or Symbol | Function |
|---|---|---|
| 100 | K(4) | Initiate transfer of phantom file from 810 storage to 870Z disk storage. |
| 101 | | Execute transfer of step 100. |
| 102 | | Operator specifies via keyboard the portion of section summary file required for edit use. |
| 103 | | Screen display of list of data required to be specified by operator 30 to specifiy step 102 - disply on screen 34. |
| 104 | | Horizon segment file is formed by execution of 870A program on designated segment summary file data and phantom file data with phantom horizons sorted on basis of time of occurrence in the section, i.e., from min. time to max. time. |
| 105 | | Load horizon edit program (HEDIT) in 810 terminal to be ready for execution of edit operation. |
| 106 | K(2) | Operator may depress key 2, unit 36, to restart the link between the horizon definition phase and horizon edit phase. |
| 107 | | Screen 34 display lists operator input necessary to specify horizon segment file. |
| 108 | | Forms display of step 107. |
| 109 | | Transfer first 128 header words (Table III) from 870A disk to 810 core. |
| 110 | | Set parameters now in core to a file suitable for screen presentations. |
| 111 | | Set velocity scale in response to unit-switch (foot-meters) parameters of Table III. |

TABLE V—Continued

Figure 9:
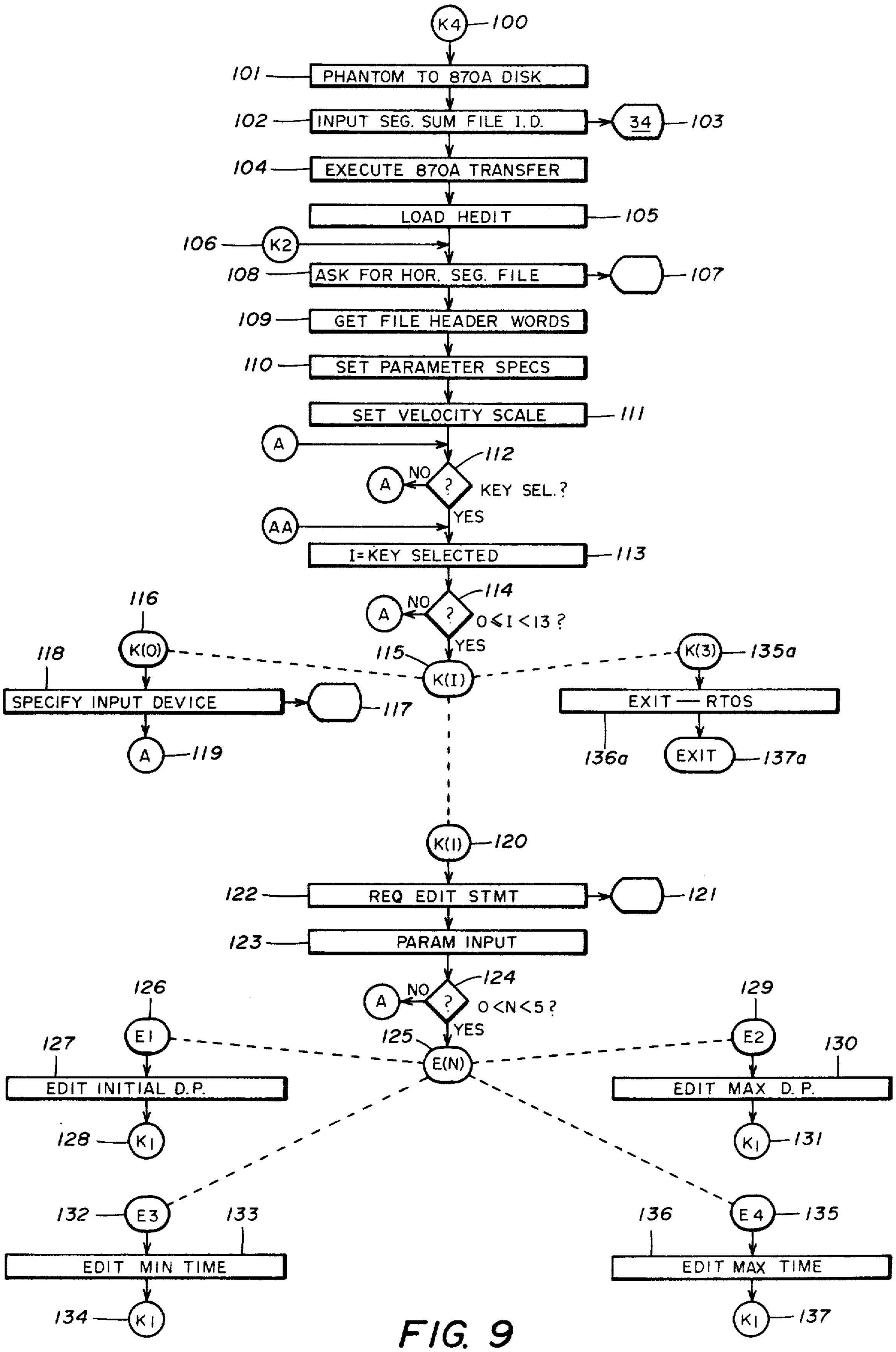
FIG. 9 is a flow chart illustrating a portion of the operations carried out in editing a horizon segment file and is related to operations instigated by an operator through unit 36, FIG. 3, wherein a keyboard having keys 0–31 are available to select different operations.

| No. | Key or Symbol | Function |
|---|---|---|
| 112 | | 810 awaits action by operator - proceed from this point by operator activating function key. |
| 113 | | When operator depresses function key, the identity of the key is stored and identified as I. |
| 114 | | Check to see if key selected is acceptable, i.e., $0<I<13$. |
| 115 | K(I) | Any key (I) between 0 and 5 may now be selected by operator 30. |
| 116 | K(0) | Operator depresses K(O). |
| 117 | | Screen 34 displays a list of data required to be specified by operator 30 to select the device he wishes to use as a system input (SI) device. |
| 118 | | Display 117 is formed. |
| 119 | | System returns to state ready for entry at point A, FIG. 9. |
| 120 | K(1) | Operator depresses K(1) to initiate conditions permitting operator 30 to edit the parameters. |
| 121 | | Display on screen 34 lists parameters to be required by operator 30. |
| 122 | | Forms parameter edit statement request for step 121. |
| 123 | | The parameter desired specified by number is input to column 1 wherein the parameter will have the number n, where $0<n<5$. |
| 124 | | Interrogate to see if n specified is greater than 0 and less than 5. If 124 is false, system to return to operating state A, FIG. 9. |
| 125 | | If 124 is true, then the operator may edit the parameter called for in step 123. |
| 126 | | Enter an edit function, where n=1, from step 125. |
| 127 | | Operator 30 edits initial depthpoint. |
| 128 | | System returns to state for K(1) operation after editing initial depthpoint. |
| 129 | | n= 2, step 125. |
| 130 | | Operator 30 edits the maximum depthpoint. |
| 131 | | Same as 128. |
| 132 | | n=3, step 125. |
| 133 | | Operator 30 edits the minimum time. |
| 134 | | Same as 128. |
| 135 | | n=4, step 125. |
| 136 | | Operator 30 edits the maximum time. |
| 137 | | Same as 128. |
| 135a | K(3) | Operator 30 depresses K(3). |
| 136a | | Exit this link. |
| 137a | | Exit to terminate operation at whatever point operator 30 has reached. |
| 139 | K(4) | Operator 30 depresses K(4). |
| 140 | | Display formed on screen 34 tabulating information required of operator 30 to input by way of data tablet by contact on tablet by stylus. (1) initial depthpoint (DPI) and initial time (TIMI). (2) initial depthpoint (DPI) and maximum time (TIMX), and (3) maximum depthpoint (DPX) and maximum time (TIMX). |
| 141 | | Execute step 140. |

TABLE V—Continued

| No. | Key or Symbol | Function |
|---|---|---|
| 142 | | Round off coordinates specified by step 141 where the DP-time grid range is DPI to DPX and TIMI to TIMX where DPI and TIMI are rounded down to a multiple of 100 milliseconds and DPX and TIMX are rounded up to multiples of 100 feet to correct for slight offsets in points contacted by operator through stylus 50. |
| 143 | | Grid lines are specified for accumulation screen 44b, five on vertical scale and 10 on horizontal scale. |
| 144 | | Grids are drawn on screen 44b. |
| 145 | | First two horizons from 870A disk identified as HOR1 and HOR2 are read into 810 core. |
| 146 | | Both horizons of step 145 are scanned for minimum and maximum time and velocity 44c and 44d. |
| 147 | | Set to grid screen 44c from minimum to maximum time of HOR1 and HOR2. |
| 148 | | Display the grid on screen 44c. |
| 149 | | Set to grid screen 44d (upper one-half) from minimum to maximum RMS velocity where velocity range is in multiple of 500 to enhance ease of use and interpretation. |
| 150 | | Form RMS velocity grid in upper half of screen 44d. |
| 151 | | Set to grid screen 44a for amplitude plot. |
| 152 | | Display grid on screen 44a. |
| 153 | | Plot all segments of HOR1 and HOR2 in depthpoint-time format on screen 44c. |
| 154 | | Plot all segments of HOR1 and HOR2 on depthpoint-velocity scale on top half of screen 44d. |
| 156 | | Execute subroutine (INTPLT) to plot interval velocity between HOR1 and HOR2 on lower half of screen 44d. |
| 157 | | Operator sets registration to OK to permit use of keys 13–23. |
| 158 | | System returns to state for entry at A, FIG. 9. |
| 159 | K(5) | Operator depresses K(5). |
| 160 | | Interrogation to see if registration is set to OK. If answer is no, enter at A, FIG. 9. If answer is yes, enter at step 161. |
| 161 | | Set DP-Time tracking mode to hard copy graph 48 and function key and a data tablet processors are saved. |
| 162 | | Clear the refresh buffer refreshing and when a segment being tracked is found then the refresh mode places the X-Y coordinates of the identified segment is a refresh buffer and then draws continuous lines connectingthe coordinates. This enhances the entire segment by producing a brighter display on the display tube. |
| 163 | | Start cursor on DP-time screen in refresh buffer by contact between stylus 50 and graph 48 placed over data tablet 46. |
| 164 | | Interrogate to see if operator has selected a key. If not, interrogation contimuess until key is selected. If key has been selected, enter at 165. |
| 165 | | Interrogate to see if function key was (K)5. If yes, enter at 166, nothing that the edit operation may be started by depressing K(5) and also is stopped by depressing K(5). |

TABLE V—Continued

| No. | Key or Symbol | Function |
|---|---|---|
| 166 | | Terminate segment edit operation by re-storing the function key and data tablet processors saved at step 161. |
| 167 | | Turn off refresh buffers. |
| 168 | | System returns to state for entry at AA, FIG. 9. |
| 169 | | Interrogate to see if key selected is greater than 16 and less than 23. |
| 170 | | If key selected is not between 16 and 23, interrogate to see if key selected is between 29 and 31. If neither step 169 nor 170 is satisfied, then system returns for entry at E, FIG. 9. |
| 171 | | Reenter program at E, FIG. 10. |
| 172 | | Set (I) to the number of the key selected. |
| 173 | | Operator depresses key (I) after having depressed K(5). |
| 174 | K5(16) | Operator depresses K(16). |
| 175 | | System tracks in depthpoint-time mode wherein cursors located on appropriate screen when operator 30 contacts a set of segment coordinates. Corresponding data on all screens is enhanced. |
| 176 | | System returns for entry at E, FIG 10. |
| 177 | K5(17) | Operator depresses K(17). |
| 178 | | System tracks in depthpoint-velocity mode wherein cursor is located on appropriate screen when operator 30 contacts a set of segment coordinates. Corresponding data on all screens is enhanced. Then system reenters program at E, FIG. 10. |
| 170 | K5(18) | Operator depresses K(18). |
| 180 | | System tracks in depthpoint-amplitude mode wherein cursor is located on appropriate screen when operator 30 contacts a set of segment coordinates. Corresponding data on all screen is enhanced. Then system reenters program at E, FIG. 10. |
| 181 | K5(19) | Operator depresses K(19). |
| 182 | | Interrogate to see if inactive segment is present. If not, system returns for entry at E, FIG. 10. |
| 182a | | If interrogation 182 yields yes, then delete the active segment and reenter program at E, FIG. 10. |
| 183 | K5(20) | Operator 30 depresses K(20). |
| 184 | | In execution of the subrouteine (AVERAGE) the specified horizon is averaged block by block and depthpoint-time is displayed on screen 44c while depthpoint-velocity is displayed on top half of screen 44d. |
| 185 | | Subroutine (INTPLT) is executed following which the program is reentered at E, FIG. 10. |
| 186 | K5(21) | Operator 30 depresses K(21). |
| 187 | | Clear all delelte flags from segments in HOR1 and HOR2. |
| 188 | | Subroutine (REPLOT) is carried out, following which the program is reentered at E, FIG. 10. |
| 189 | K5(22) | Operator 30 depresses K(22). |
| 190 | | Subroutine (REPLOT) is carried out following which program is reentered at E, FIG. 10. |
| 191 | K5(23) | Operator 30 depresses K(23). |

TABLE V – Continued

| No. | Key or Symbol | Function |
|---|---|---|
| 192 | | Set data tablet X-Y input to be proceassed by (ZOOM) subroutine. |
| 193 | | Interrogate to determine if two times have been inputted to system. If not, interrogation cycle continues until operator has entered two input times. |
| 194 | | Operator sets maximum and minimum times. |
| 195 | | Subroutine (REPLOT) is performed. |
| 196 | | Restore data tablet X-Y processing to X-YK5 and then reenter program at E, FIG. 10. |
| 197 | K5(29) | Operator 30 depresses K(29). |
| 198 | | Interrogate to see if there is an active segment. If not, reenter program at E, FIG. 10. |
| 199 | | Interrogate when active segment present to determine if the tracking mode is in the time mode. If not, reenter the program at E, FIG. 10. |
| 200 | | For active segment tracking and time, set data tablet X-Y processing to (SEGEDT) subroutine and function key to enter SEGFKT. |
| 201 | | Entry point (SEGFKT). |
| 202 | | Terminate by restoring function key and data tablet processing. |
| 203 | | Interrogate to see if the key depressed is K(29). If not, reenter the program at E, FIG 10. |
| 204 | | If key selected in 203 was K(29), then go to FK K5. |
| 205 | K5(30) | Operator depresses K930). |
| 206 | | Interrogate to see if there is an active segment present. If not, reenter program at E, FIG 10. |
| 207 | | When active segment present, interrogate to see if tracking is in velocity mode. If not, reenter program at E, FIG. 10. |
| 208 | | If active segment involved in tracking and velocity modes, set data tablet X-Y processing to subroutine (SEGEDV) and function key to cent at (SEGFKV) |
| 209 | | Entry point (SEGFKV) |
| 210 | | Function key selected. |
| 211 | | Terminate by restoring function key and data tablet processing. |
| 212 | | Interrogate to see if key depressed was K(30). If not, enter program at E, FIG. 10. IF so, go to 204. |
| 213 | K5(31) | Operator depresses K(31). |
| 214 | | Interrogate to see if the time is set to respond to the hard copy. |
| 215 | | If time mapping not set to hard copy in step 214, set time to be mapped from hard copy registered to DP-time surface. |
| 216 | | Turn function K(31) lights on and enter program at E, FIG. 10. |
| 217 | | If time mapping is set to hard copy in step 214, then set time to mapped from data tablet surface to screenC44c on deathpoint-time surface. |
| 218 | | Turn K(31) light off and enter at E, FIG. 10. |
| 219 | KYK5 | Data tablet X-Y input processor for segment editing. |
| 220 | | Interrogate to see if the system is set in the tracking mode for time, amplitude or velocity. |

TABLE V – Continued

| No. | Key or Symbol | Function |
|---|---|---|
| 221 | | If the tracking mode is set in the time mode, then map X-Y coordinates to the DP-time and position the cursor in the refresh buffer. |
| 222 | | If the tracking mode is velocity, map X-Y coordinates to DP-velocity and position cursor in refresh buffer. |
| 223 | | If tracking mode is amplitude, map X-Y coordinates to DP-amplitude and position cursor in refresh buffer. |
| 224 | | All segments in HOR1 and HOR2 are to be checked through steps 221, 222 or 223. |
| 225 | | Interrogate to see if cursor is within 7 X-Y units of a segment. If not, enter at E, FIG. 10. |
| 226 | | If cursor is within 7 X-Y units of segment, set the segment to (ACTIVE). |
| 227 | | Place segment DP-time, DP-velocity and DP-amplitude array in refresh buffer and enter at E, FIG. 10. |
| 228 | SEGEDT | Execute subroutine (SEGEDT) employing data tablet X-Y input processor for time EDIT. |
| 229 | | Map X-Y to DP-time and position cursor in refresh buffer. |
| 230 | | Interrogate to see if depthpoint is within active segment. If not, enter at F, FIG. 11. |
| 231 | | If depthpoint is within active segment, then adjust closest depthpoint sample of segment to time input and enter at F, FIG. 11. |
| 232 | SEGEDV | Execute subroutine (SEGEDV( where data tablet X-Y input is set for velocity edit. |
| 233 | | Msp X-Y coordinates to DP-velocity and position cursor in refresh buffer. |
| 234 | | Interrogate to see if depthpoint is within an active segment. If not, enter at G, FIG. 11. |
| 235 | | If depthpoint is within an active segment, adjust closest depthpoint sample of segment to velocity input and enter at G, FIG. 11. |
| 236 | INTPLT | Execute subroutine (INTPLT) to compute and plot interval velocity between HOR1 and HOR2. |
| 237 | | Form array of minimum to maximum DP of HOR1 and HOR2. |
| 238 | | Average the time of HOR1 and HOR2 at start depthpoint for all segments. |
| 239 | | Designate average time as horizon average time at start depthpoint. |
| 240 | | Set average velocity as horizon velocity average of all depthpoints. |
| 241 | | Compute horizon average time at all depthpoints greater than start depthpoint by the relationship average $I_{(i+n)} = I_i + (\Delta T \Delta DP)_{(average)} \Delta DP$ |
| 242 | | Compute interval velocity between HOR1 and HOR2, based upon the relationship $IV = \sqrt{{}^{o}V_2{}^2T_2 - V_1{}^2T_1/T_2 - T_1}$. |
| 243 | | Interrogate to see if the interval velocity = 0, is less than 0 or is greater than 0. |
| 244 | | If interval velocity = 0, so designate and reenter program. |

TABLE V—Continued

Figures 15, 16, 17, 18:
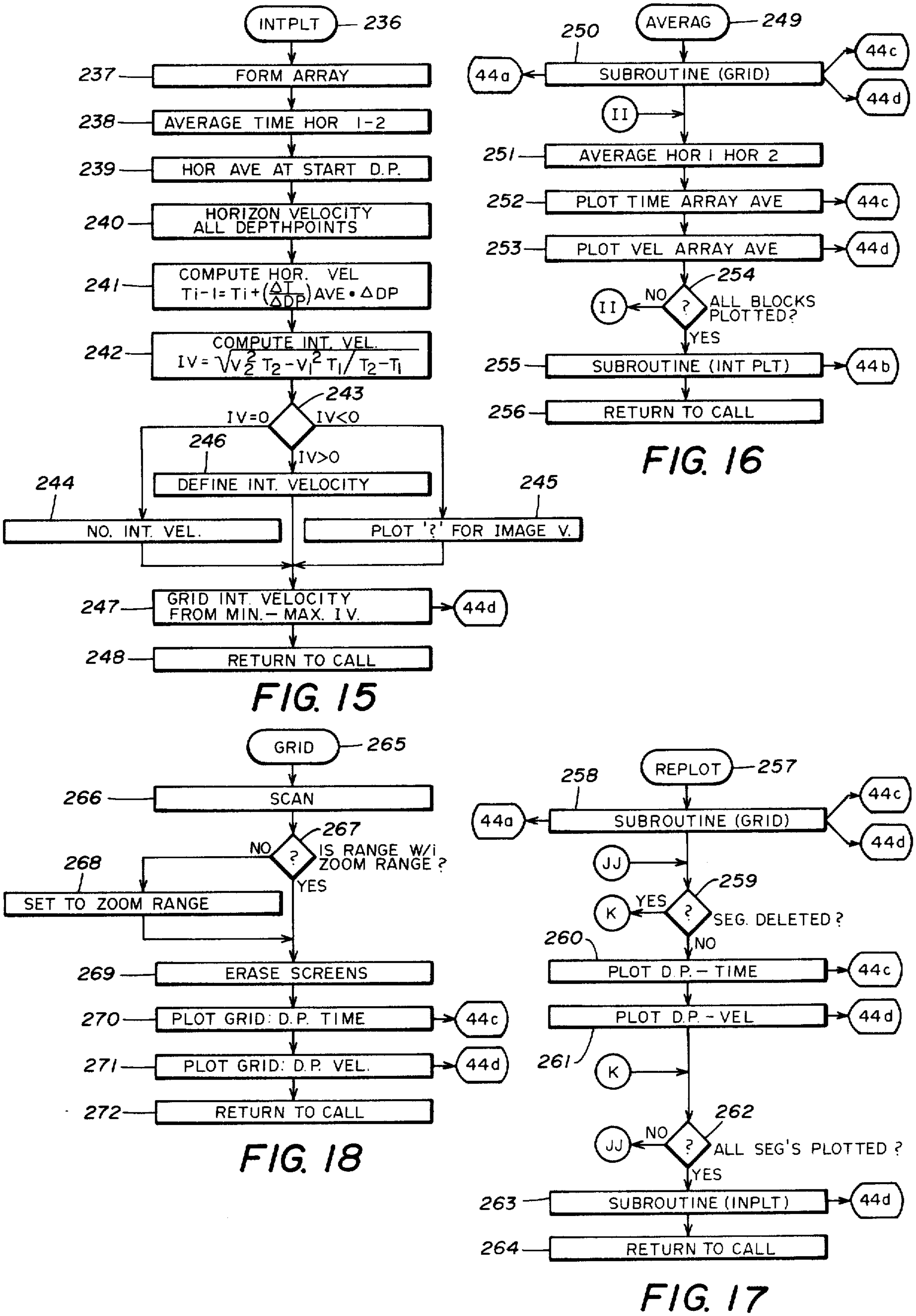
FIG. 15 is a flow chart for subroutine INTPLT.
FIG. 16 is a flow chart for subroutine AVERAG.
FIG. 17 is a flow chart for subroutine REPLOT.
FIG. 18 is a flow chart for subroutine GRID.

| No. | Key or Symbol | Function |
|---|---|---|
| 245 | | If interval velocity is less than 0, plot a question mark on the screen to indicate an imaginary interval velocity at this point. |
| 246 | | Enter the value of the velocity. Velocity is defined as compensated at these points. |
| 247 | | Grid the interval veloxity from minimum to maximum interval velocity with minimum scale of 500 feet per scale interval on lower half of screen 44d. |
| 248 | | Return to calling program. |
| 249 | AVE-RAG | Execute subroutine (AVERAG) for averages of HOR1 and HOR2 and plot. |
| 250 | | Execute subroutine (GRID) to provide grids on screens 44a, 44c and 44d. |
| 251 | | Average each block of HOR1 and HOR2 for the time average dip (MS/DP) at depthpoint and velocity average = velocity at the depthpoint. |
| 252 | | Plot time array average. |
| 253 | | Plot velocity array average. |
| 254 | | Interrogate to see if all blocks are plotted. If not, enter program at II. |
| 255 | | Execute subroutine (INTPLT). |
| 256 | | Return to calling program. |
| 257 | REPLOT | Execute subroutine (REPLOT). |
| 258 | | Execute subroutine (GRID) for display screens 44a, 44c and 44d. |
| 259 | | Interrogate to see if segment is deleted. If so, enter at K, FIG. 17. |
| 260 | | If segment is not deleted, plot segment depthpoint-time array on screen 44c. |
| 261 | | Plot depthpoint-velocity array on screen 44d. |
| 262 | | Interrogate to see if all segments are plotted. If not, enter program at JJ, FIG 17. |
| 263 | | Execute subroutine (INTPLT). |
| 264 | | Return to calling program. |
| 265 | GRID | Execute subroutine (GRID). |
| 266 | | Scan all segments from MAX and MIN time and velocity. |
| 267 | | Interrogate to see if range is within (ZOOM) range. |
| 268 | | If range is not within (ZOOM) range, then set to (ZOOM) range. |
| 269 | | Erase screens 44c and 44b. |
| 270 | | Plot grids for DP-time range of screen 44d. |
| 271 | | P lot grids for DP-velocity range on screen 44d. |
| 272 | | Return to calling program. |
| 273 | K(6) | Operator depresses K(6). |
| 274 | | Interrogate to see if there are more than 100 words of core behind the horizon segment file. If not, enter program at A, FIG. 9. |
| 275 | | If there are more than 100 words of core behind the horizon segment file, set alternate horizon definition for active horizon |
| 276 | | Set number of segments in each block=0. |
| 277 | | Set function key to be processed by K6FK and data table X-Y processing to be processed by K6XY. |

TABLE V—Continued

Figures 19, 20, 21:
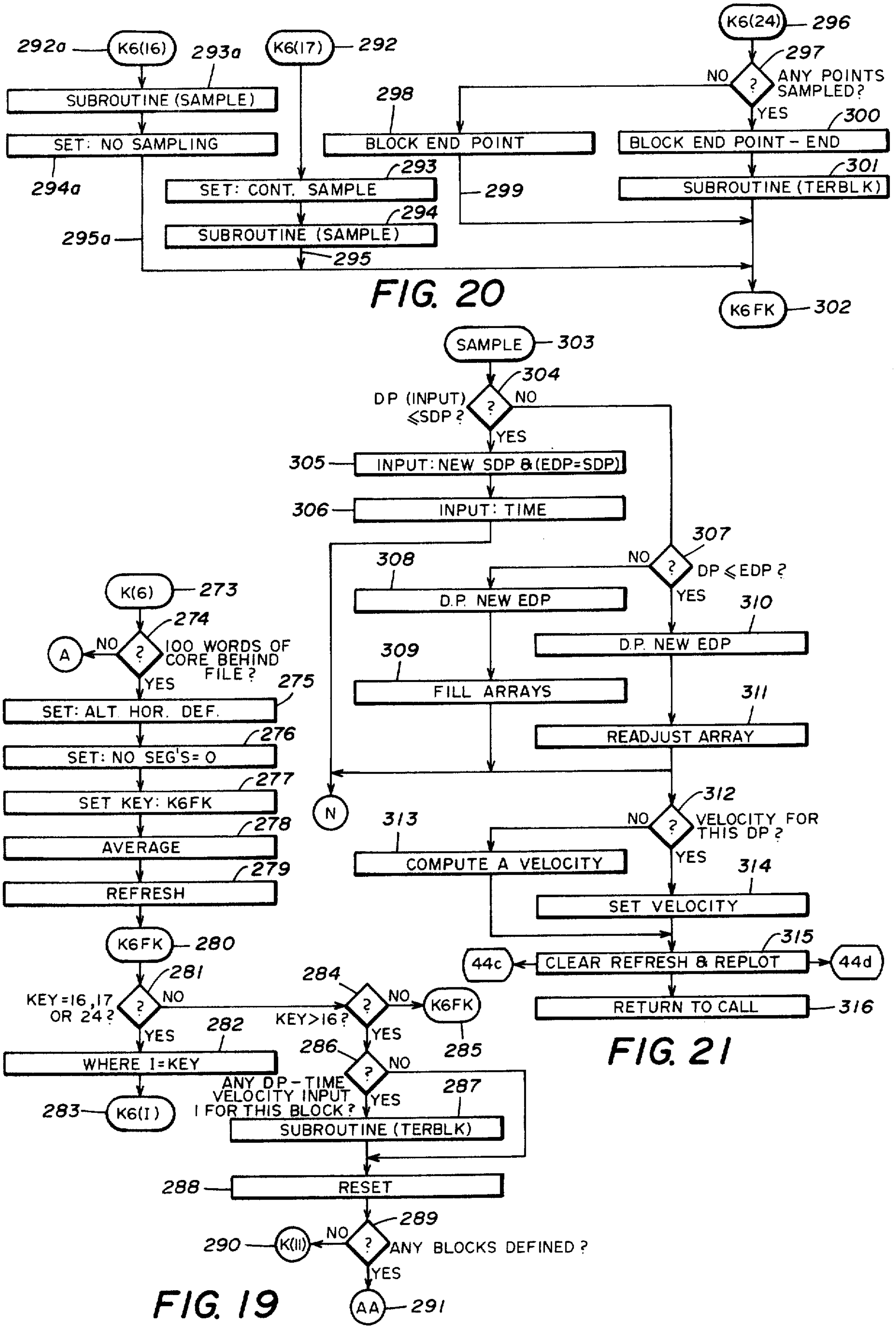
FIG. 19 is a flow chart for operations initiated by actuation of key K6.
FIG. 20 is a flow chart illustrating operations initiated by actuation of keys K6(16), (17), (24)
FIG. 21 is a flow chart illustrating a subroutine SAMPLE.
Figures 22, 23, 24, 25, 26:
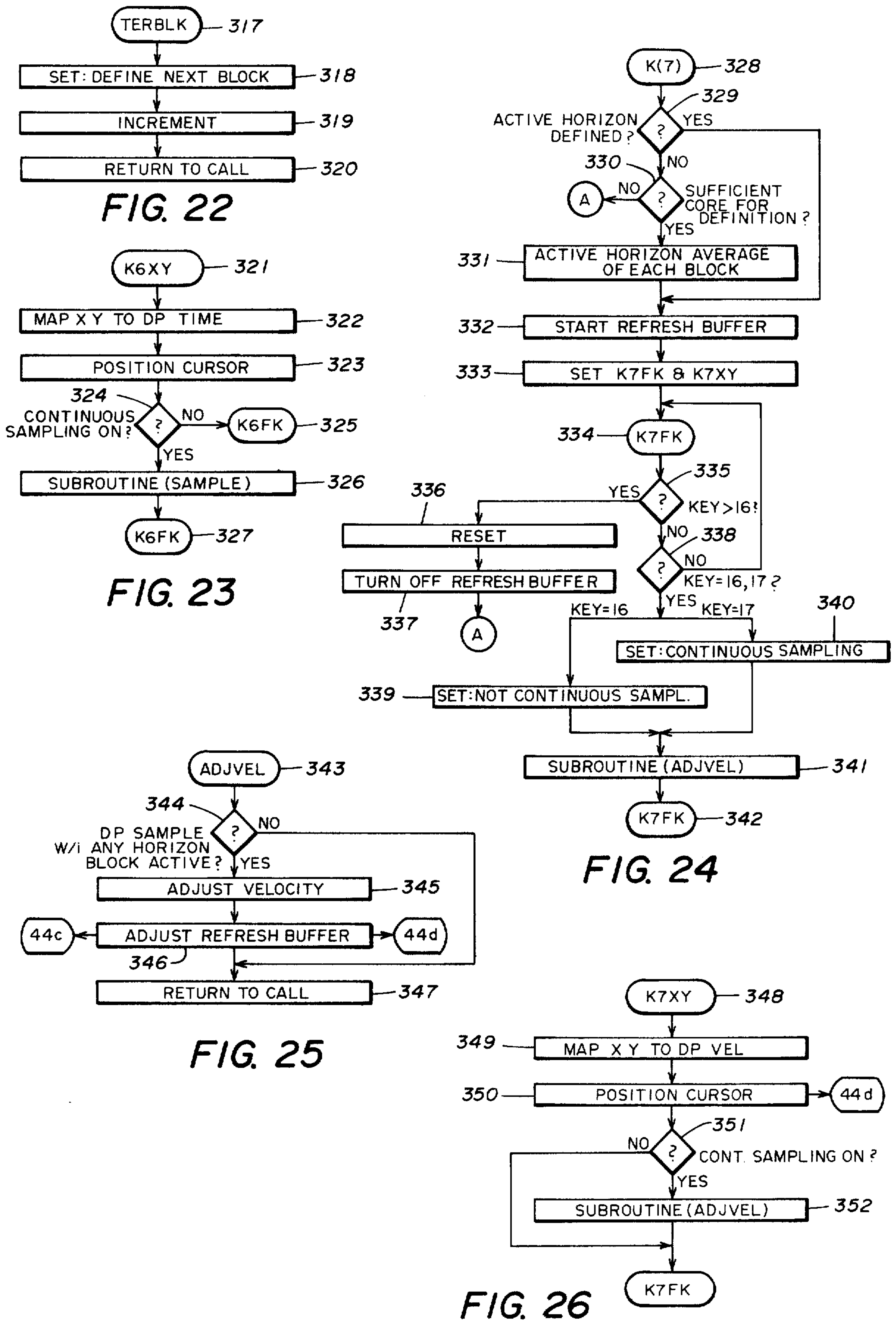
FIG. 22 is a flow chart illustrating a subroutine TERBLK.
FIG. 23 is a flow chart illustrating operations initiated by depressing key K6 and entering X–Y via a keyboard.
FIG. 24 is a flow chart illustrating operations initiated by depressing key K7.
FIG. 25 is a flow chart illustrating the subroutine ADJVEL.
FIG. 26 is a flow chart initiated by depressing key K7 and entering X–Y through the teletype.

| No. | Key or Symbol | Function |
|---|---|---|
| 278. | | From an array by averaging active velocities at each depth point and save the DP-velocity coordinates resulting therefrom. |
| 279 | | Clear refresh buffer and start refreshing |
| 280 | | Function K6 is selected. |
| 281 | | Interrogate to see if the selected key is K(16), K(17) or K(24). |
| 282 | | If the key selected is K(16), K(17) or K(24), I is set to the number of the key. |
| 283 | | Operator depresses K(I). |
| 284 | | If the key selected is not K(16), K(17) or K(24), interrogate to see if the key is less than 16. |
| 285 | | If the key selected is less than 16, the operator depresses K(6) of the function keys. |
| 286 | | If the key selected is greater than 16, interrogate to see if there is any DP-time-velocity inputs entered for this block. |
| 287 | | If there have been such inputs, 286, then execute subroutine (TERBRK( which terminates this block. |
| 288 | | Reset the system for data tablet and |
| 289 | | Interrogate to see if any blocks have been defined. |
| 290 | | If no blocks have been defined, operator depresses K(11). |
| 291 | | If blocks have been defined, enter program at AA, FIG. 9. |
| 292a | K6(16) | Operator depresses key (16). |
| 293a | | Execute the subroutine (SAMPLE) to define a sample point for this block. |
| 294a | | Set for no sampling. |
| 295a | | Proceed with program K6FK. |
| 292 | K6(17) | Operator 30 depresses K(17). |
| 293 | | Set the system for continuous sampling. |
| 294 | | Execute the subroutine (SAMPLE). |
| 295 | | Proceed with program K6FK. |
| 296 | K6(24) | Operator 30 depresses K(24). |
| 297 | | Interrogate to see if any points have been sampled. |
| 298 | | Classify input block end point for beginning of block. |
| 299 | | Enter program at K6FK. |
| 300 | | If points have been sampled, 297, input the block end point classification for end of block. |
| 301 | | Execute subroutine (TEBBLK). |
| 302 | | Continue operation of program at K6FK. |
| 303 | SAMPLE | Execute subroutine (SAMPLE). |
| 304 | | Interrogate to see if starting depth input is equal to or less than then starting depthpoints where the starting depthpoint (SDP) is the starting depthpoint of a block (or segment) and the ending depthpoint is the end depthpoint of block (or segment). |
| 305 | | If the interrogation is yes, 304, then the new starting depthpoint is input (EDP=SDP). |
| 306 | | Input TIME and go to N, FIG. 21. |
| 307 | | If depthpoint input is greater than starting depthpoint, interrogate to see if |

TABLE V—Continued

Figures 27, 32:
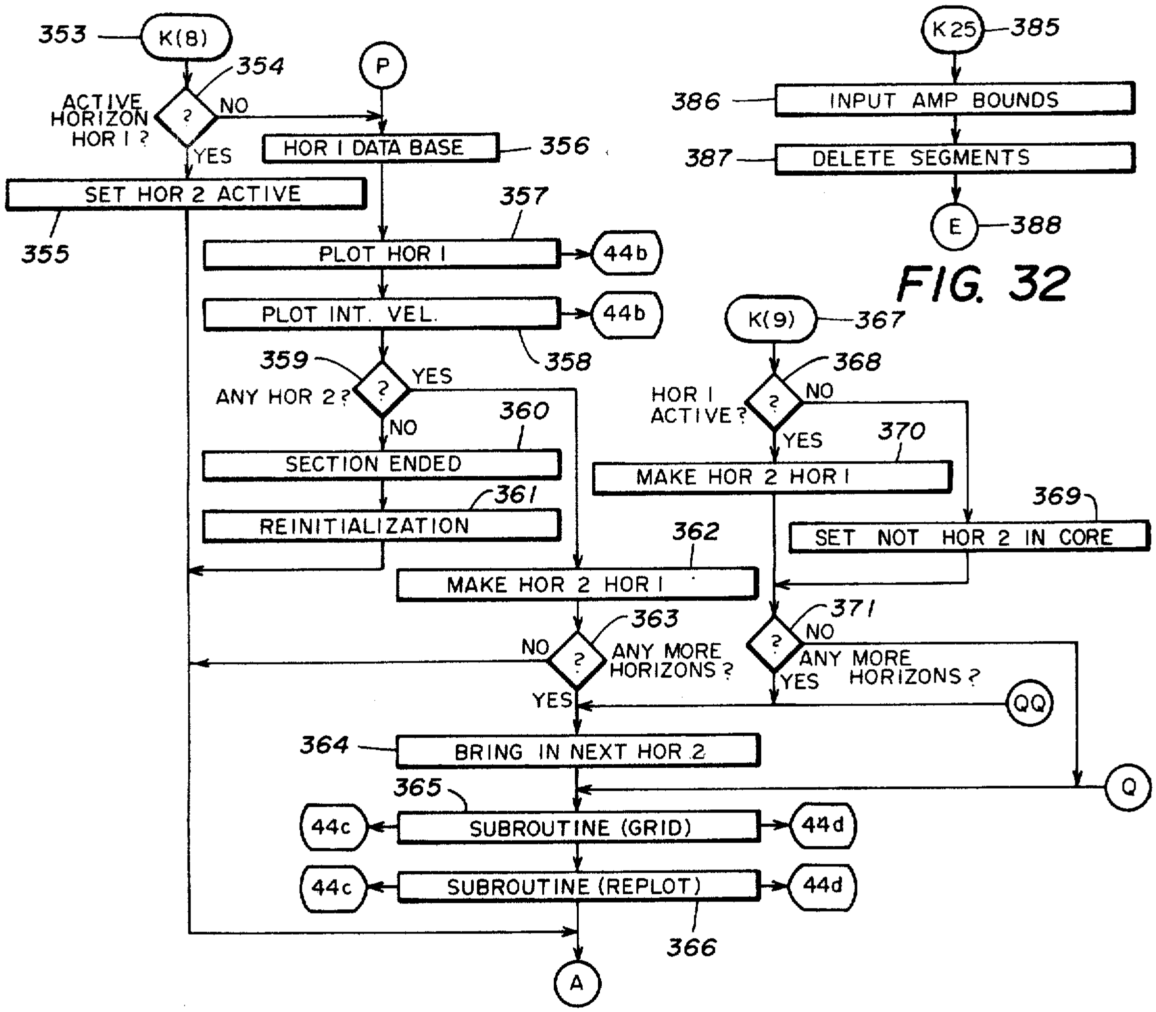
FIG. 27 is a flow chart illustrating operations initiated by depressing key K8.
FIG. 32 is a flow chart illustrating operation by depressing key K25.
Figure 28:
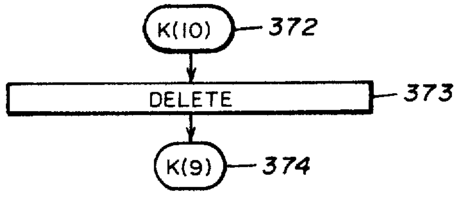
FIG. 28 is a flow chart illustrating operations initiated by depressing key K10.
Figure 29:
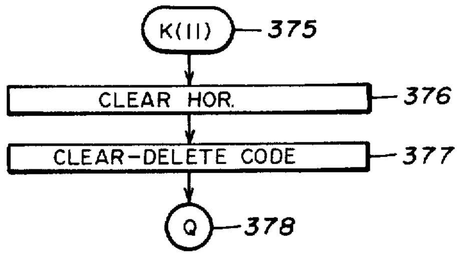
FIG. 29 is a flow chart illustrating operations initiated by depressing key K11.
Figure 30:
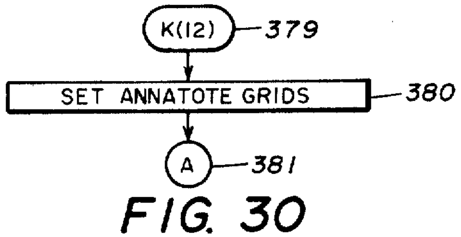
FIG. 30 is a flow chart illustrating operations initiated by depressing key K12.
Figure 31:
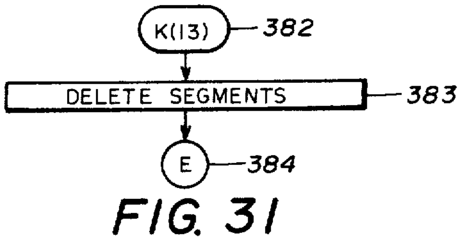
FIG. 31 is a flow chart illustrating operation by depressing key K13.

| No. | Key or Symbol | Function |
|---|---|---|
| | | depthpoint input is equal to or less than the end depthpoint. |
| 308 | | If input depthpoint is equal to or greater than the end depthpoint, the depthpoint is a new end depthpoint to move forward. |
| 309 | | Fill arrays with DP-time gate centers between end depthpoint and new end depthpoint (depthpoint and time) and enter program at N. |
| 310 | | If input depthpoint is not equal to or greater than the end depthpoint, the input depthpoint is new, end depthpoint must be backed up. |
| 311 | | Readjust array pointers and insert DP-time. |
| 312 | | Interrogate to see if there is a velocity for the depthpoint input. |
| 313 | | If no velocity for the input depthpoint, compute a velocity V where V=500+(TIME) |
| 314 | | If there is a velocity for the input depthpoint, set the velocity in the array. |
| 315 | | Clear the refresh buffer and replot segment arrays for this horizon in the refresh buffer and on screens 44c and 44d. |
| 316 | | Return to calling program. |
| 317 | TERBLK | Execute subroutine (TERBLK). |
| 318 | | Set colon to define next block. |
| 319 | | Increment number of blocks in this horizon. |
| 320 | | Return to calling program. |
| 321 | K6XY | Set system for dataa tablet X-Y input to the processor. |
| 322 | | Map X-Y coordinates to DP-time. |
| 323 | | Position cursor in refresh buffer to sample DP-time position. |
| 324 | | Interrogate to see if continuous sampling mode is turned on. |
| 325 | | If continuous sampling mode not on, enter program at K6FK. |
| 326 | | If continuous sampling mode is turned on, execute subroutine (SAMPLE). |
| 327 | | Enter program at K6FK. |
| 328 | K(7) | Operator 30 depresses K(7). |
| 329 | | Interrogate to see if there is an active horizon defined. |
| 330 | | if no active horizon has been defined, interrogate to see if there is sufficient core available for such definition. If not, enter at A, FIG. 9. |
| 331 | | If there is sufficient core for definition, define an active horizon by the average of each block. |
| 332 | | Start the refresh buffer displacing active horizon definition. |
| 333 | | Set the system to process function key by K7FK and data tablet X-Y processing by K7XY. |
| 334 | | Function key K7FK has been selected. |
| 335 | | Interrogate to see if the selected key is greater than 16. |
| 336 | | If the selected key is greater than 16 reset for a function key processing and data tablet processing. |
| 337 | | Turn off refresh buffer and enter program at A, FIG. 9. |
| 228 | | If function key selected is less than 16, 225, interrogate to see if the key selected is K(16) or K(17). If not, reenter program at K7FK. |
| 339 | | If the selected key is K(16), set the system for not continuous sampling. |
| 340 | | If the key selected is K(17), set the system for continuous samping. |
| 341 | | Execute subroutine (ADJVEL). |
| 342 | | Return program K7FK. |
| 343 | ADJVEL | Execute subroutine (ADJVEL). |
| 344 | | Interrogate to see if depthpoint sampled is within any horizon block that is active. |
| 345 | | If interrogation 344 is yes, adjust the closest depthpoint to velocity value sample. |
| 346 | | Adjust refresh buffer and activate screens 44c and 44d. |
| 347 | | Return to calling program. |
| 348 | K7XY | Execute subroutine K7XY. |
| 349 | | Map XY to DP-velocity |
| 350 | | Position cursor in refresher buffer and activate screen 44d. |
| 351 | | Interrogate to see if continuous sampling mode is on. |
| 352 | | If interrogation 351 is yes, execute subroutine (ADJVEL) and enter program at K7FK. |
| 353 | K(8) | Operator depresses K(8). |
| 354 | | Interrogate to see if active horizon is HOR1. |
| 355 | | If interrogation354 is yes, set HOR2 to active and enter program at A, FIG. 9. |
| 356 | | If the interrogation 354 is no, call computer 870A to update HOR1 into the data base. |
| 357 | | Plot HOR1 on the screen 44h. |
| 358 | | Plot interval velocity between HOR1 and HOR2 on grid lines if HOR2 exists. |
| 359 | | Interrogate to see if there is a HOR2. |
| 360 | | If interrogation 359 is no, the section is then flagged as ended. |
| 361 | | Set the system to require reinitialization and enter program at A, FIG 9. |
| 362 | | If interrogation 359 is yes, make HOR2 now HOR1. |
| 363 | | Interrogate to see if there are any more horizons. If the interrogation is no, reenter progam at A. FIG. 9. |
| 364 | | If interrogation 363 is yes, bring the next horizon in as HOR2. |
| 365 | | Execute subroutine (GRID) for screens 44c and 44d. |
| 366 | | Execute subroutine (REPLOT) and display On screens 44c and 44d and reenter program at A. |
| 367 | K(9) | Operator 30 depresses K(9). |
| 368 | | Interrogate to see if HOR1 is an active horizon. |
| 369 | | If interrogation 368 is no, set not HOR2 in core. |
| 370 | | If interrogation 368 is yes, make HOR2 now HOR1. |
| 371 | | Interrogate to see if there are any more horizons. If not, enter program at Q, FIG. 27. If there are more horizons, enter program at QQ, FIG. 27. |
| 372 | K(10) | Operator depresses K(10). |
| 373 | | Delete active horizonts from 870A data base. |
| 374 | | Proceed with program by depressing K(9). |
| 375 | K(11) | Operator depresses K(11). |
| 376 | | Clear all horizon alternate definitions for HOR1 and HOR2. |
| 377 | | Clear-all segment delete codes for HOR1 and HOR2. |
| 378 | | Enter program at Q, FIG 27. |
| 379 | K(12) | Operator 30 depresses K(12). |
| 380 | | Set the system to annotate all grids with section extension and crossline information from data base. |

TABLE V—Continued

Figure 10:
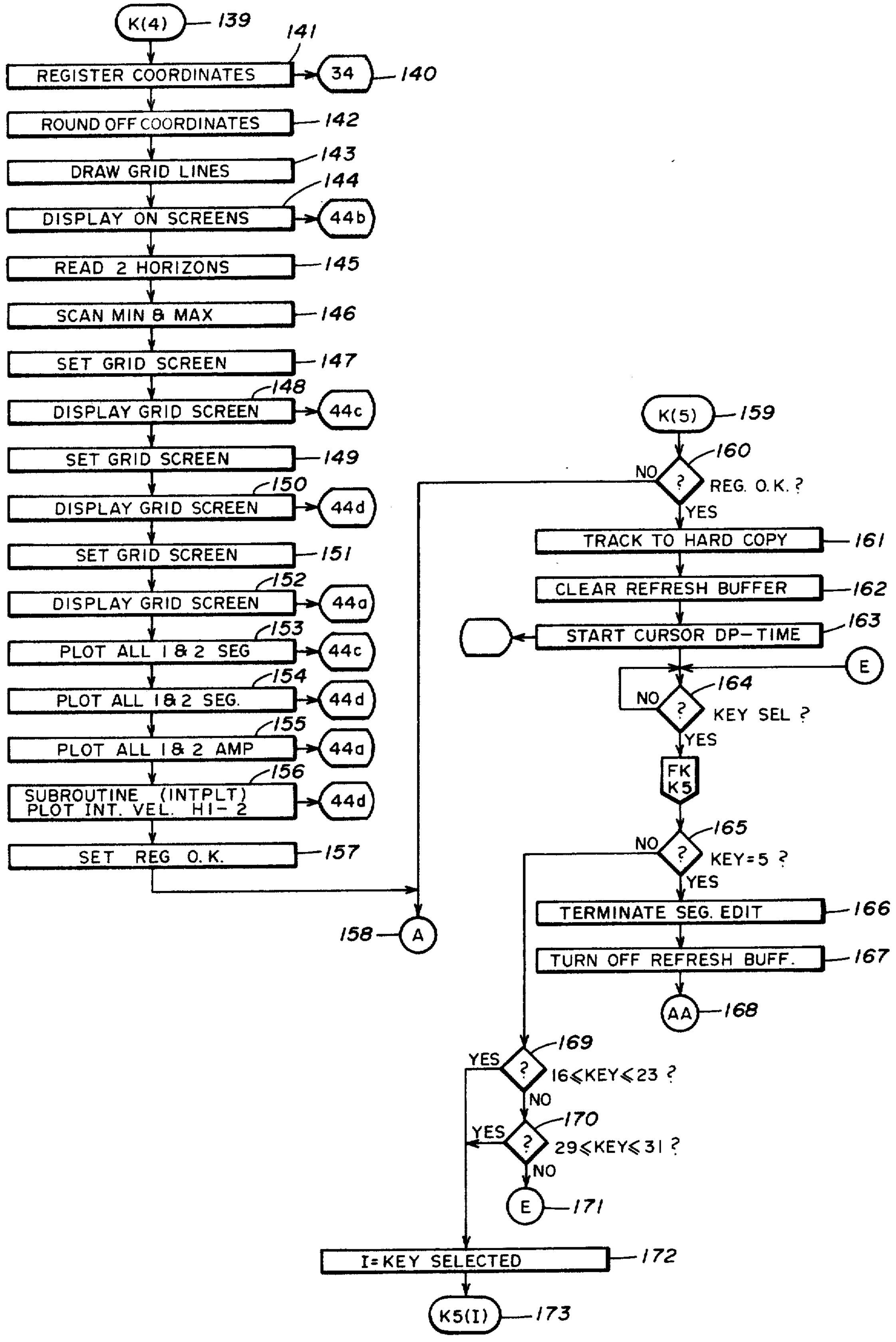
FIG. 10 illustrates a continuation of the flow chart of FIG. 9 showing operations in response to actuations of keys K4 and K5.
Figure 11:
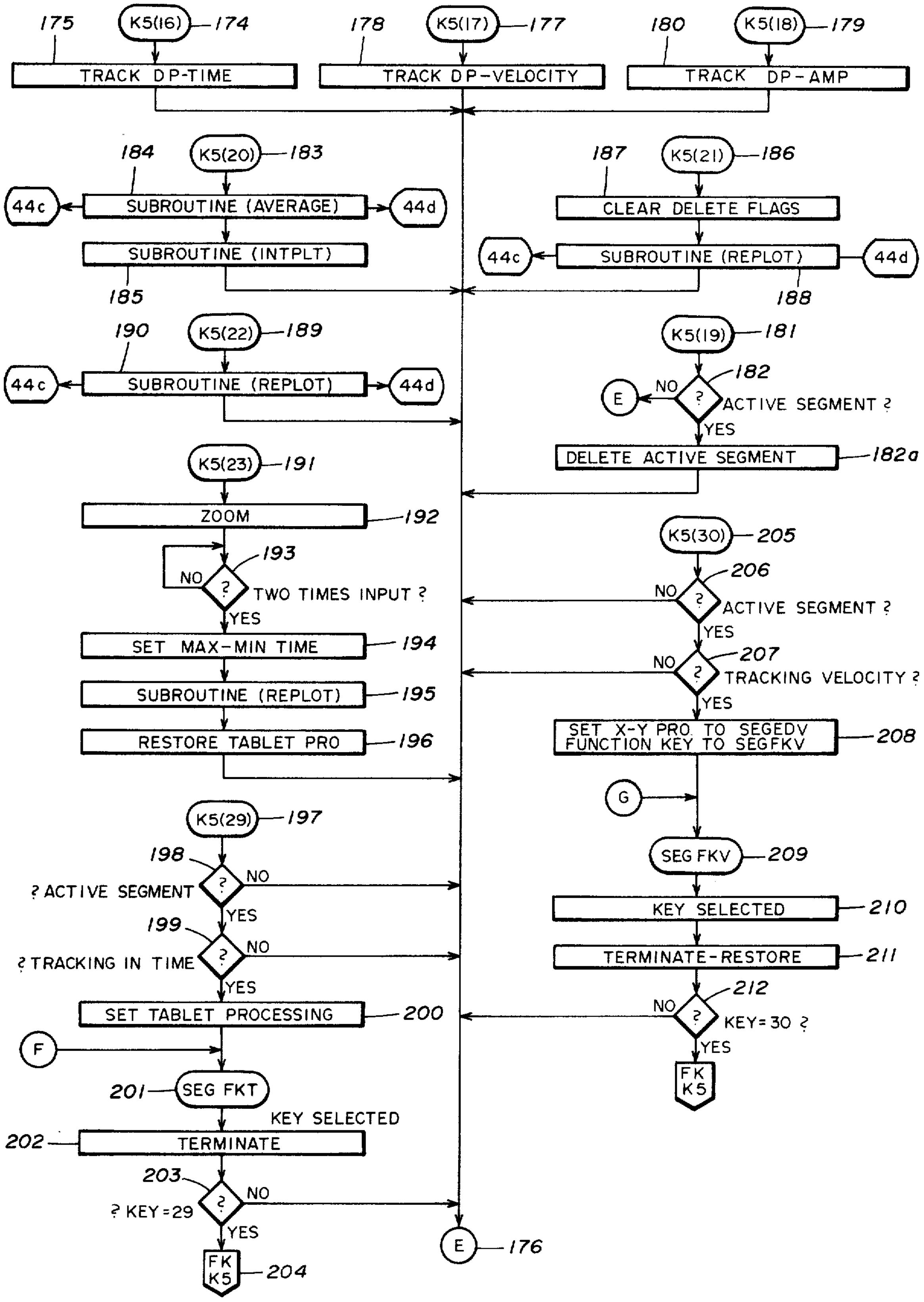
FIG. 11 illustrates the flow charts for operations initiated by actuation of keys K5(16), K5(17), K5(18), K5(19), K5(20), K5(21), K5(22), K5(23), K5(29), K5(30)
Figure 12:
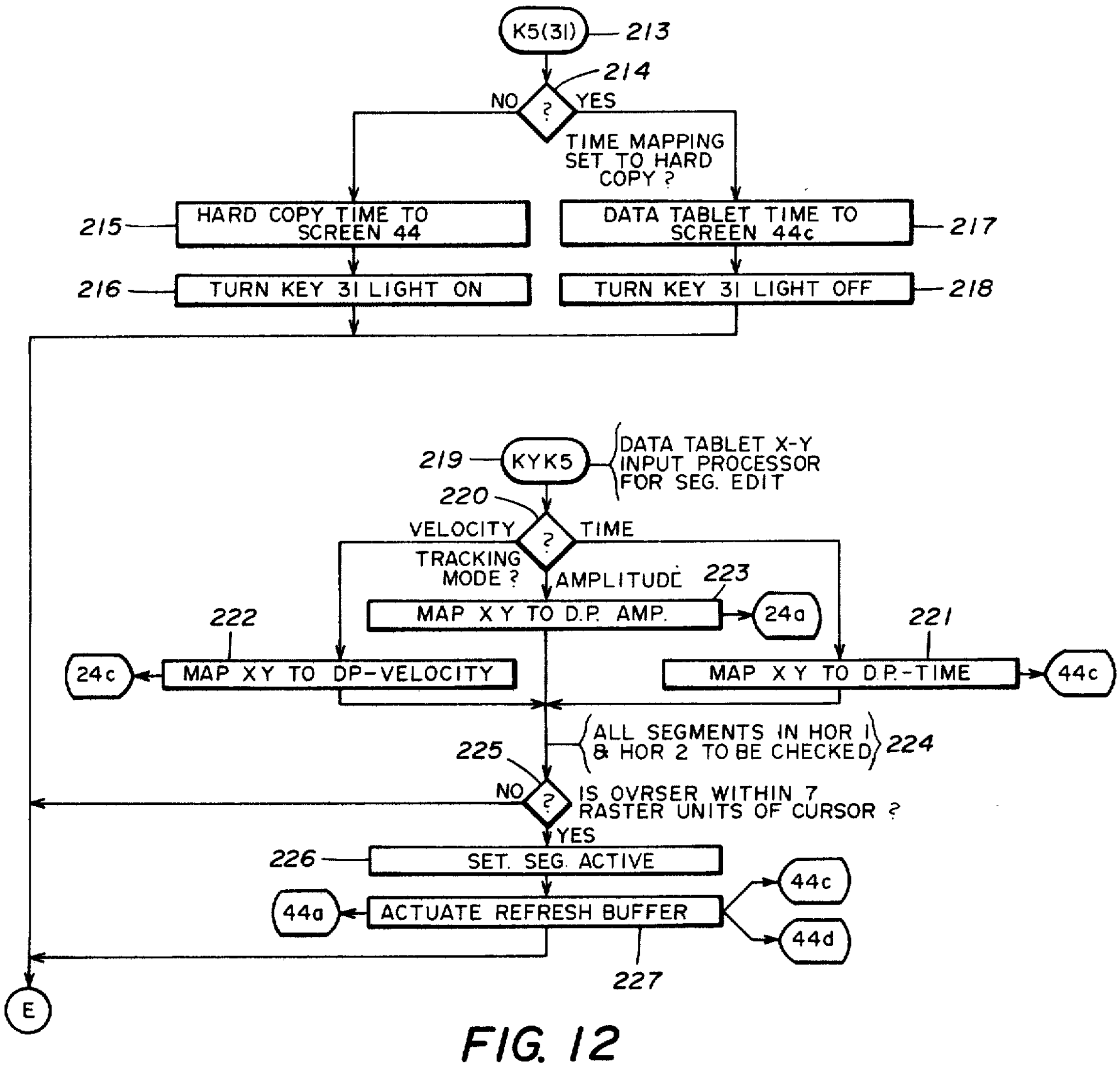
FIG. 12 is a flow chart illustrating operations initiated by actuation of key K5(31)
Figure 13:
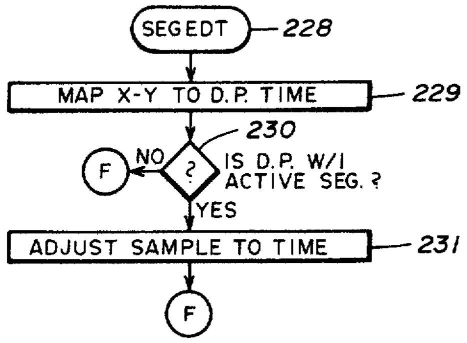
FIG. 13 is a flow chart for subroutine SEGEDT.
Figure 14:
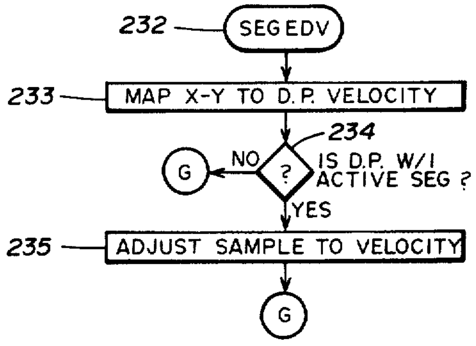
FIG. 14 is a flow chart for subroutine SEGEDV.

| No. | Key or Symbol | Function |
|---|---|---|
| 381 | | Enter program at A, FIG. 9. |
| 382 | K(13) | Operator 30 depresses K13. |
| 383 | | Scan all segments for a given horizon and delete all segments except segment chosen by cursor. |
| 384 | | System reenters program at E, FIG. 10. |
| 385 | K(25) | Operator 30 depresses K(25). |
| 386 | | Operator 30 inputs amplitude bounds. |
| 387 | | Delete all segments which have amplitude less than bounds. |
| 388 | | System reenters program at E, FIG. 10. |

The foregoing indicates availability to operator 30 of editing tools to work on the horizon data base. Edit operations start with a display, FIG. 5, where the upper horizon 61, together with all of the seismic segments in the horizon segment file within a selected time gate of horizon 61, are displayed for inspection by operator 30. The various options illustrated in horizon edit operations beginning with step 105, FIG. 9, look to the ultimate selection by the operataor of one horizon for the set 61 and one horizon for the set 62. The operator has available the RMS velocity data for all of the segments of FIG. 5. They are available as the set 75, FIG. 7, with one curve plotted for each segment. When operating in accordance with Table V with a given segment active, data related to the active segment on all of the displays 44*a*, 44*b* and 44*c* is enhanced by the line on screens 44*a*, 44*b* and 44*c* made much brighter than lines forming the rest of the displays. Operator 30 may make selections based upon immediate availability of critical data. He may eliminate any of the segments from the display of FIG. 5 should he so desire accompanied by immediate display of the effect of such removal on all related screens.

As one final result, the operator selects one segment for each of the two sets 61 and 62 of FIG. 5. The segment selected from set 61, FIG. 5, is then stored in an accumulation file and is displayed as segment 61*m*, FIG. 6.

With the accumulation and display of segment 61*m*, FIG. 6, there automatically is provided an annotation for the segment 61*m*. As illustrated in FIG. 6, in the space gate between depthpoints 1 and 37, the velocity for segment 61*m* is 7985 feet/second. In the space gate between depthpoints 37 and 73, the velocity for segment 61*m* is 8300 feet/second, and in the space gate between depthpoints 73 and 109, the velocity is 9100 feet/second. In the space gate between depthpoints 109 and 145, the velocity is 8100 feet/second and between depthpoints 145 and 181, the velocity is 8800 feet/second.

A similar annotation will be provided for each of the succeeding segments selected and accumulated in the display of FIG. 6. Segment 62*m* of FIG. 6 represents the operator's selection for the horizon representing the set 62 of FIG. 5. When this is done, the tabular data representing horizons 61*m* and 62*m* is entered into the horizon segment file in accordance with the steps outlined in Table V and all of the segment data from the horizon segment file related to horizons 61*m* and 62*m*, and specifically all of the data shown in FIG. 5, is then erased from the horizon segment file. Such data display is replaced by the data representing the two segments 61*m* and 62*m*.

As the segments 61*m* and 62*m* are selected, the display on screen 44*c* is changed. More particularly, it is changed so that it is of the form illustrated in FIG. 8. In FIG. 8, the upper trace 61*n* represents the RMS velocity represented by horizon 61*m* of FIG. 6. The function 62*n* represents the RMS velocity for the horizon 62*m* of FIG. 6.

The interval velocity displayed on the lower half of the screen 44*c*, represented by the plot 62*p*, is interval velocity for the earth section between horizon 61*m* and horizon 62*m*. In accordance with the operations outlined in Table V, the latter display shown in FIG. 8 is automatically provided operator 30 upon his accumulation in an accumulator file of the data representing horizons 61*m* and 62*m*.

Following the selection of horizons 61*m* and 62*m*, the horizon 62*m* is then placed on screen 44*b* as the top horizon on an expanded time scale and the operator then designates another horizon for editing by a repeat of the procedures followed to edit and select horizons 61 and 62. More particularly, with reference to FIG. 4, operator 30 selects the horizon 63 for presentation on screen 44*b*. Along with this data, there is presented all of the segments from the horizon segment file within a preset time gate above and below layer 63. From this data, the undesired segments in the region of layer 63 are erased, the corresponding velocity and amplitude files are simultaneously modified so that operator 30 may knowingly interact with the display system through the data tablet 46, function selector 36 and keyboard 32 to select or identify one horizon for the data in and around layer 63. This horizon is then accumulated for display on screen 44*d*.

The foregoing procedure would then be extended through the entire section. As above noted, it is preferable that the operation in editing the horizons be initiated with the shallow-most horizon and proceed to the deepest horizon, such as layer 66, FIG. 4. The edit operations end with a horizon segment file that represents the most realistic interpretation of the section based upon the statistical data available in the amplitude and velocity displays.

Thus, in accordance with the invention, a programmed computer-human interaction edit method is provided for seismic horizon data such as established in a horizon segment file. A two-dimensional graph of such horizon segment file data is assumed to exist. Phanton horizon data is provided for the horizon segment file with reference to coordinates of the graph. In the method, the horizon segment file is first stored in retrievable form, limited to horizon segment data that lies within preselected constraints. Responsive to stored horizon segment data, displays of segments are produced for two contiguous phantom horizons, together with all constraint satisfying horizons on the graph within a selectable time gate above and below each of the phantom horizons. From the display, there is selected one horizon in the region of the upper phantom horizon. Data representing the selected horizon is then stored in an accumulator file and is presented through a display to the operator. Thereafter, a second selected horizon in the region of the second phantom horizon is defined and the data representing the same is accumulated and displayed.

Preferably, a second display is produced of the second of the first two horizons and a third, next contiguus, horizon from which a third selected horizon is de-.ned, accumulated, stored and displayed. Succeeding isplays are produced of successively deeper horizon airs until the entire section has been edited.

In the selection process, by contact with the data tab-:t through the use of stylus 50 through the graph, the ıperator can delete any segment from the first display ınd simultaneously produce a display of the effect of uch deletion on related velocity displays.

The form in which data is initially presented is indi-:ated in Tables I–IV above. Reference has been made o the "600 Package" as a preferred manner to prepro-:ess data for editing by the present method. By way of 'urther background as to such preprocessing, reference s had to Geophysics, December 1971, Vol. 36, No. 6, ɔp 1043–1059. This description is incorporated herein ɔy such reference as background material with FIG. 5 .hereof (p. 1052) illustrating a graph of a seismic sec-:ion of the type which may represent the starting point 'or the present method.

Having described the invention in connection with :ertain specific embodiments thereof, it is to be under-stood that further modifications may now suggest themselves to those skilled in the art and it is intended to cover such modifications as fall within the scope of the appended claims.

What is claimed is:

1. A seismic data selective display system comprising:

a data tablet having a surface for receiving a two dimensional graph of primary horizon segment data and including a stylus movable relative to said surface for generating electrical signals representative of a desired location of horizon data on said two dimensional graph, means for storing electrical representations of said horizon segment data including means for generating electrical position signals representative of selected portions of said horizon segment data, first display means responsive to said electrical position signals for displaying horizon segment data including means responsive to said electrical signals generated by said stylus for displaying lines traced by movement of said stylus over said two dimensional graph and said data tablet surface, and a function key box interconnected to said display means which includes a plurality of switches for controlling the selection of portions of the displayed horizon segment data.

2. The system of claim 1 and further comprising:

second display means for displaying a depth point-RMS velocity profile for all displayed horizon segments.

3. The system of claim 2 and further comprising:

third display means for displaying depth point-interval velocity data for the earth section between the displayed horizon segments.

4. The system of claim 2 and further comprising:

additional means for storing in retrievable form phantom horizon data generated by movement of said stylus across said data tablet including means for storing only portions of said selected horizon segment data.

5. A seismic data selective display system comprising:

a data tablet having a surface for receiving a two dimensional graph of primary horizon segment data and including a stylus movable relative to said surface for generating electrical signals representative of a desired location of a horizon data on said two dimensional graph, means for storing electrical representations of said horizon segment data including means for generating electrical position signals representative of selected portions of said horizon segment data, first display means responsive to said electrical position signals for displaying horizon segment data including means responsive to said electrical signals generated by said stylus for displaying lines traced by movement of said stylus over said two dimensional graph and said data tablet surface, a function key box interconnected to said display means which includes a plurality of switches for the selection of portions of the displayed horizon segment data, second display means for displaying a depth point-RMS velocity profile for all horizon segments on said first display means, third display means for displaying depth point-interval velocity data for the earth section between the horizons on said first display means, operative means connected to said second and third display means for reflecting the deletion of data corresponding to the nonselected horizon segment data.

6. The system of claim 5 and further comprising:

additional means for storing in retrievable form phantom horizon data generated by movement of said stylus across said data tablet including means for storing only portions of said selected horizon segment, and fourth display means for displaying said selected stored horizon segment data.

* * * * *